US008824706B2

(12) United States Patent
Stephanou et al.

(10) Patent No.: US 8,824,706 B2
(45) Date of Patent: Sep. 2, 2014

(54) PIEZOELECTRIC MICROPHONE FABRICATED ON GLASS

(75) Inventors: Philip Jason Stephanou, Mountain View, CA (US); David William Burns, San Jose, CA (US)

(73) Assignee: Qualcomm MEMS Technologies, Inc., San Diego, CA (US)

(*) Notice: Subject to any disclaimer, the term of this patent is extended or adjusted under 35 U.S.C. 154(b) by 323 days.

(21) Appl. No.: 13/221,676

(22) Filed: Aug. 30, 2011

(65) Prior Publication Data
US 2013/0051586 A1  Feb. 28, 2013

(51) Int. Cl.
| H04R 25/00 | (2006.01) |
| C03C 17/36 | (2006.01) |
| H04R 1/04 | (2006.01) |
| C03C 27/08 | (2006.01) |
| C03C 27/10 | (2006.01) |
| H04R 1/06 | (2006.01) |
| H04R 17/02 | (2006.01) |
| H04R 19/04 | (2006.01) |
| H04R 1/08 | (2006.01) |
| H04R 19/00 | (2006.01) |

(52) U.S. Cl.
CPC .............. *C03C 17/3639* (2013.01); *H04R 1/04* (2013.01); *H04R 1/06* (2013.01); *H04R 17/025* (2013.01); *H04R 19/04* (2013.01); *H04R 2499/11* (2013.01); *H04R 2499/15* (2013.01); *C03C 27/08* (2013.01); *C03C 27/10* (2013.01); *H04R 1/086* (2013.01); *H04R 19/005* (2013.01)
USPC ............................ 381/174; 381/175; 381/191

(58) Field of Classification Search
CPC .... H04R 17/02; H04R 17/025; H04R 19/005; H04R 19/04; H04R 19/016; H04R 31/006; H04R 2499/11; G01L 9/0042; B81C 2203/0792; B81B 7/0064
USPC ......... 381/355, 356, 369, 173, 174, 175, 190, 381/191; 29/594, 25.41, 25.42; 257/416, 257/417, 684; 438/53
See application file for complete search history.

(56) References Cited

U.S. PATENT DOCUMENTS

| 3,343,256 A | 9/1967 | Smith |
| 3,372,070 A | 3/1968 | Paul |

(Continued)

FOREIGN PATENT DOCUMENTS

| DE | 102007001290 A1 | 7/2008 |
| EP | 1571435 A1 | 9/2005 |

(Continued)

OTHER PUBLICATIONS

International Search Report and Written Opinion dated Nov. 7, 2012, from Application Serial No. PCT/US2012/051909.

(Continued)

*Primary Examiner* — Huyen D Le
(74) *Attorney, Agent, or Firm* — Weaver Austin Villeneuve & Sampson, LLP

(57) ABSTRACT

This disclosure provides systems, methods and apparatus for glass-encapsulated microphones. In one aspect, a glass-encapsulated microphone may include a glass substrate, an electromechanical microphone device, an integrated circuit device, and a cover glass. The cover glass may be bonded to the glass substrate with an adhesive, such as epoxy, or a metal bond ring. The cover glass may have any of a number of configurations. In some configurations, the cover glass may define an aperture for the electromechanical microphone device at an edge of the glass-encapsulated microphone. In some configurations, the cover glass may define a cavity to accommodate the integrated circuit device that is separate from a cavity that accommodates the electromechanical microphone device.

33 Claims, 24 Drawing Sheets

(56) References Cited

U.S. PATENT DOCUMENTS

| | | |
|---|---|---|
| 3,462,650 A | 8/1969 | Hennings et al. |
| 3,648,131 A | 3/1972 | Stuby |
| 4,258,468 A | 3/1981 | Balde |
| 4,352,961 A | 10/1982 | Kumada et al. |
| 4,445,978 A | 5/1984 | Whartenby et al. |
| 5,295,395 A | 3/1994 | Hocker et al. |
| 5,422,190 A | 6/1995 | Alexander |
| 5,510,655 A | 4/1996 | Tanielian |
| 5,511,428 A | 4/1996 | Goldberg et al. |
| 5,569,958 A | 10/1996 | Bloom |
| 5,683,594 A | 11/1997 | Hocker et al. |
| 5,841,099 A | 11/1998 | Owen et al. |
| 6,057,602 A | 5/2000 | Hudson et al. |
| 6,076,726 A | 6/2000 | Hoffmeyer et al. |
| 6,114,240 A | 9/2000 | Akram et al. |
| 6,147,397 A | 11/2000 | Burns et al. |
| 6,207,905 B1 | 3/2001 | Taga et al. |
| 6,221,769 B1 | 4/2001 | Dhong et al. |
| 6,229,190 B1 | 5/2001 | Brysek et al. |
| 6,249,586 B1 * | 6/2001 | Stoffel et al. ............ 381/174 |
| 6,255,728 B1 | 7/2001 | Nasiri et al. |
| 6,268,660 B1 | 7/2001 | Dhong et al. |
| 6,280,641 B1 | 8/2001 | Gaku et al. |
| 6,336,366 B1 | 1/2002 | Thundat et al. |
| 6,346,742 B1 | 2/2002 | Bryzek et al. |
| 6,351,996 B1 | 3/2002 | Nasiri et al. |
| 6,400,009 B1 | 6/2002 | Bishop et al. |
| 6,423,905 B1 | 7/2002 | Brodsky et al. |
| 6,559,487 B1 | 5/2003 | Kang et al. |
| 6,559,530 B2 | 5/2003 | Goldsmith et al. |
| 6,589,594 B1 | 7/2003 | Hembree |
| 6,599,833 B2 | 7/2003 | Farquhar et al. |
| 6,600,214 B2 | 7/2003 | Ishikawa et al. |
| 6,690,032 B1 | 2/2004 | Umetsu |
| 6,696,758 B2 | 2/2004 | Dubin et al. |
| 6,777,263 B1 | 8/2004 | Gan et al. |
| 6,829,937 B2 | 12/2004 | Mahon |
| 6,836,020 B2 | 12/2004 | Cheng et al. |
| 6,846,725 B2 | 1/2005 | Nagarajan et al. |
| 6,888,233 B2 | 5/2005 | Horning et al. |
| 6,910,268 B2 | 6/2005 | Miller |
| 6,912,078 B2 | 6/2005 | Kudrie et al. |
| 6,953,985 B2 | 10/2005 | Lin et al. |
| 6,964,882 B2 | 11/2005 | Yun Chang et al. |
| 6,967,362 B2 | 11/2005 | Nam et al. |
| 6,977,224 B2 | 12/2005 | Dubin et al. |
| 7,029,829 B2 | 4/2006 | Stark et al. |
| 7,098,117 B2 | 8/2006 | Najafi et al. |
| 7,184,202 B2 | 2/2007 | Miles et al. |
| 7,217,588 B2 | 5/2007 | Hartzell et al. |
| 7,263,883 B2 | 9/2007 | Park et al. |
| 7,291,833 B2 | 11/2007 | Sherrer et al. |
| 7,348,550 B2 | 3/2008 | Sherrer et al. |
| 7,355,166 B2 | 4/2008 | Sherrer et al. |
| 7,357,017 B2 | 4/2008 | Felton et al. |
| 7,466,834 B2 * | 12/2008 | Ogura et al. ............ 381/174 |
| 7,569,410 B2 | 8/2009 | Hartzell et al. |
| 7,569,421 B2 | 8/2009 | Do et al. |
| 7,781,249 B2 | 8/2010 | Laming et al. |
| 7,812,418 B2 | 10/2010 | Hsu et al. |
| 7,916,880 B2 | 3/2011 | Starnes et al. |
| 2002/0146200 A1 | 10/2002 | Kudrle et al. |
| 2003/0137056 A1 | 7/2003 | Taniguchi et al. |
| 2004/0028849 A1 | 2/2004 | Stark et al. |
| 2004/0092105 A1 | 5/2004 | Lee et al. |
| 2004/0217455 A1 | 11/2004 | Shiono et al. |
| 2005/0105245 A1 | 5/2005 | Kuisma et al. |
| 2006/0127640 A1 | 6/2006 | Kobayashi et al. |
| 2006/0141650 A1 | 6/2006 | Kim et al. |
| 2006/0148137 A1 | 7/2006 | Hartzell et al. |
| 2006/0231961 A1 | 10/2006 | Shibayama et al. |
| 2007/0000323 A1 | 1/2007 | Kuisma |
| 2007/0023851 A1 | 2/2007 | Hartzell et al. |
| 2007/0099327 A1 | 5/2007 | Hartzell et al. |
| 2007/0201715 A1 | 8/2007 | Minervini |
| 2008/0006850 A1 | 1/2008 | Ribnicek et al. |
| 2008/0063232 A1 * | 3/2008 | Song ............ 381/355 |
| 2008/0067073 A1 | 3/2008 | Kagawa et al. |
| 2008/0101625 A1 | 5/2008 | Fazzio et al. |
| 2008/0257591 A1 | 10/2008 | Ikeda |
| 2008/0283991 A1 | 11/2008 | Reinert |
| 2009/0001553 A1 | 1/2009 | Pahl et al. |
| 2009/0085191 A1 | 4/2009 | Najafi et al. |
| 2010/0044808 A1 | 2/2010 | Dekker et al. |
| 2010/0068453 A1 | 3/2010 | Imai et al. |
| 2010/0254547 A1 | 10/2010 | Grosh et al. |
| 2010/0322443 A1 | 12/2010 | Wu et al. |
| 2013/0051587 A1 | 2/2013 | Stephanou et al. |

FOREIGN PATENT DOCUMENTS

| | | |
|---|---|---|
| EP | 1640322 A2 | 3/2006 |
| KR | 1020090044938 A | 5/2009 |
| WO | 2013/032820 A1 | 3/2013 |
| WO | 2013/032821 A1 | 3/2013 |

OTHER PUBLICATIONS

International Search Report and Written Opinion dated Nov. 30, 2012, from Application Serial No. PCT/US2012/051905.

US Office Action dated Sep. 17, 2013 in U.S. Appl. No. 13/221,791.

Notice of Allowance for U.S. Appl. No. 13/221,791 mailed Dec. 16, 2013.

Notice of Allowance for U.S. Appl. No. 13/221,791 mailed Feb. 3, 2014.

Notice of Allowance for U.S. Appl. No. 13/221,791 mailed Mar. 14, 2014.

* cited by examiner

Common Voltages

|  | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

Segment Voltages

PIEZOELECTRIC MICROPHONE FABRICATED ON GLASS

RELATED APPLICATION

This application is related to U.S. patent application Ser. No. 13/221,791, entitled "PIEZOELECTRIC MICROPHONE FABRICATED ON GLASS" and filed Aug. 30, 2011, which is hereby incorporated by reference.

TECHNICAL FIELD

This disclosure relates to electromechanical system devices and more particularly to electromechanical microphone devices.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Another type of electromechanical systems device is a microphone. A microphone is a device that converts sound waves into electrical signals. In some implementations, a component of a microphone interacts with a sound wave, and this interaction produces an electrical signal.

SUMMARY

The systems, methods and devices of the disclosure each have several innovative aspects, no single one of which is solely responsible for the desirable attributes disclosed herein.

One innovative aspect of the subject matter described in this disclosure includes apparatus for detecting sound. In some implementations, an apparatus for detecting sound includes a glass substrate. An electromechanical microphone device is disposed on the surface of the glass substrate. An integrated circuit device also is disposed on the surface of the glass substrate. The integrated circuit device is configured to sense output from the electromechanical microphone device. A cover glass is bonded to the surface of the glass substrate. The cover glass includes a first recess that defines a first cavity when the cover glass is bonded to the surface of the glass substrate. The first cavity is configured to accommodate the electromechanical microphone device. A portion of the first recess is at an edge of the cover glass such that the cover glass and the glass substrate, when bonded together, define an aperture at the edge of the cover glass. The aperture is configured to allow a sound wave to interact with the electromechanical microphone device.

In some implementations, the surface of the glass substrate can include a plurality of conductive traces and a plurality of ledge pads. The plurality of conductive traces can be in electrical contact with the integrated circuit device. Each of the plurality of ledge pads is in electrical contact with a conductive trace of the plurality of conductive traces. Further, the plurality of ledge pads can be on an outside surface of the apparatus when the cover glass is bonded to the surface of the glass substrate.

Another innovative aspect of the subject matter described in this disclosure can be implemented in an apparatus for detecting sound including a glass substrate. An electromechanical microphone device is disposed on the surface of the glass substrate. An integrated circuit device also is disposed on the surface of the glass substrate. The integrated circuit device is configured to sense output from the electromechanical microphone device. A cover glass is bonded to the surface of the glass substrate with a joining ring. The cover glass includes a first recess that defines a first cavity and a second recess that defines a second cavity when the cover glass is bonded to the surface of the glass substrate. The first cavity is configured to accommodate the electromechanical microphone device, and the second cavity is configured to accommodate the integrated circuit device. A portion of the first recess is at an edge of the cover glass such that when the cover glass is bonded to the surface of the glass substrate, the cover glass and the glass substrate define an aperture at the edge of the cover glass. The aperture is configured to allow a sound wave to interact with the electromechanical microphone device.

Another innovative aspect of the subject matter described in this disclosure also can be implemented in an apparatus for detecting sound including a glass substrate. An electromechanical microphone device is disposed on the surface of the glass substrate. A cover glass is bonded to the surface of the glass substrate with a joining ring. The cover glass includes a first recess that defines a first cavity when the cover glass is bonded to the surface of the glass substrate. The first cavity is configured to accommodate the electromechanical microphone device. The apparatus further includes one or more ports configured to allow a sound wave to interact with the electromechanical microphone device.

Another innovative aspect of the subject matter described in this disclosure can be implemented in a method of forming an acoustic microphone including providing a glass substrate. The glass substrate has an electromechanical microphone device disposed on a surface of the glass substrate. A cover glass is bonded to the surface of the glass substrate. The cover glass includes a first recess that defines a first cavity when the cover glass is bonded to the surface of the glass substrate. The first cavity is configured to accommodate the electromechanical microphone device. A portion of the first recess is at an edge of the cover glass such that when the cover glass is bonded to the surface of the glass substrate, an aperture is defined. The aperture is configured to allow a sound wave to interact with the electromechanical microphone device.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
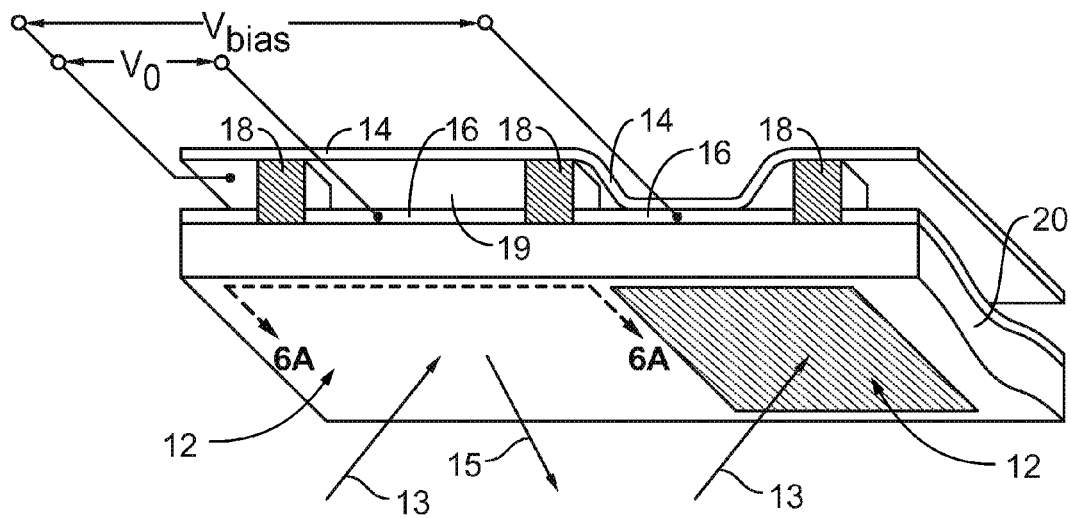
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., electromechanical systems (EMS), MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to one having ordinary skill in the art.

Some implementations described herein relate to glass-encapsulated microphones. In some implementations, a glass-encapsulated microphone includes a glass substrate, an electromechanical microphone device, an integrated circuit device, and a cover glass. The cover glass may be bonded to the glass substrate with an adhesive, such as epoxy, glass frit, or a metal bond ring.

The cover glass may have any of a number of configurations. For example, the cover glass may include a recess that forms a cavity when the cover glass is bonded to the surface of the glass substrate. The recess also may form an aperture at an edge of the glass-encapsulated microphone, with the aperture providing an opening that may allow a sound wave to interact with the electromechanical microphone device. As another example, the cover glass may include two recesses that form two cavities when the cover glass is bonded to the surface of the glass substrate. One cavity may accommodate the integrated circuit device, and one cavity may accommodate the electromechanical microphone device. Further configurations of the cover glass are described herein.

Some implementations described herein relate to piezoelectric sense elements for an electromechanical microphone device. In some implementations, a piezoelectric sense element includes a glass substrate, electrode layers, piezoelectric layers, and elastic layers. A piezoelectric layer in a piezoelectric sense element may generate a voltage in response to a sound wave that produces a strain in the piezoelectric layer. The piezoelectric sense element may covert a sound wave into an electrical signal. The elastic layers may serve to modify the neutral plane of the piezoelectric sense element.

A piezoelectric sense element may include any number of different configurations. For example, the piezoelectric sense element may include a first electrode layer, a first piezoelectric layer on the first electrode layer, a second electrode layer on the first piezoelectric layer, and a second piezoelectric layer on the second electrode layer. The first piezoelectric layer may generate a voltage in response to an induced strain from a sound wave. The second piezoelectric layer may serve to modify the neutral plane of the piezoelectric sense element such that the first piezoelectric layer may generate a voltage. Further configurations of piezoelectric sense elements, including hybrid piezoelectric and capacitive sense elements, are described herein.

Particular implementations of the subject matter described in this disclosure can be implemented to realize one or more of the following potential advantages. Generally, a glass-encapsulated microphone can provide a low cost, small size, low profile, and low power consumption microphone. In some implementations, a glass-encapsulated microphone may be a directional microphone or a microphone that is insensitive to ambient noise. In some implementations, a glass-encapsulated microphone may isolate the integrated circuit device from ambient conditions with the electromechanical microphone device still being capable of sensing sound.

Generally, an electromechanical microphone device with a piezoelectric sense element may provide mechanical robustness, lower cost, and improved performance compared to other electromechanical microphone devices. Implementations of piezoelectric sense elements described herein can provide a linear response, increased dynamic range, improved sensitivity, and ease of fabrication.

Further, microphones that are fabricated on glass substrates can be compatible with displays and other devices that are also fabricated on glass substrates, as the microphones can either be fabricated jointly with the other devices or attached as a separate device, the combination having well-matched thermal expansion properties. The materials employed can result in a high thermal budget that enables reflow or wave soldering to attach the device to a printed circuit board. Microphonic sensors with piezoelectric sense elements can offer low power advantages, in part because the acoustic sound waves that strike the microphone generate a charge that can be readily amplified with suitable electronic circuitry. In some implementations, the electronic circuitry is fabricated out of silicon and the silicon die is thinned and attached to the glass substrate with the piezoelectric sense element formed thereon, providing a short signal path for the sensing elements. In some other implementations, a glass cover is placed over the microphonic sense elements and the silicon die, providing protection for the sense elements and silicon die while allowing sound to penetrate through ports in the glass cover.

An example of a suitable electromechanical systems (EMS) or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the IMOD 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the IMOD 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the IMOD 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated IMOD 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
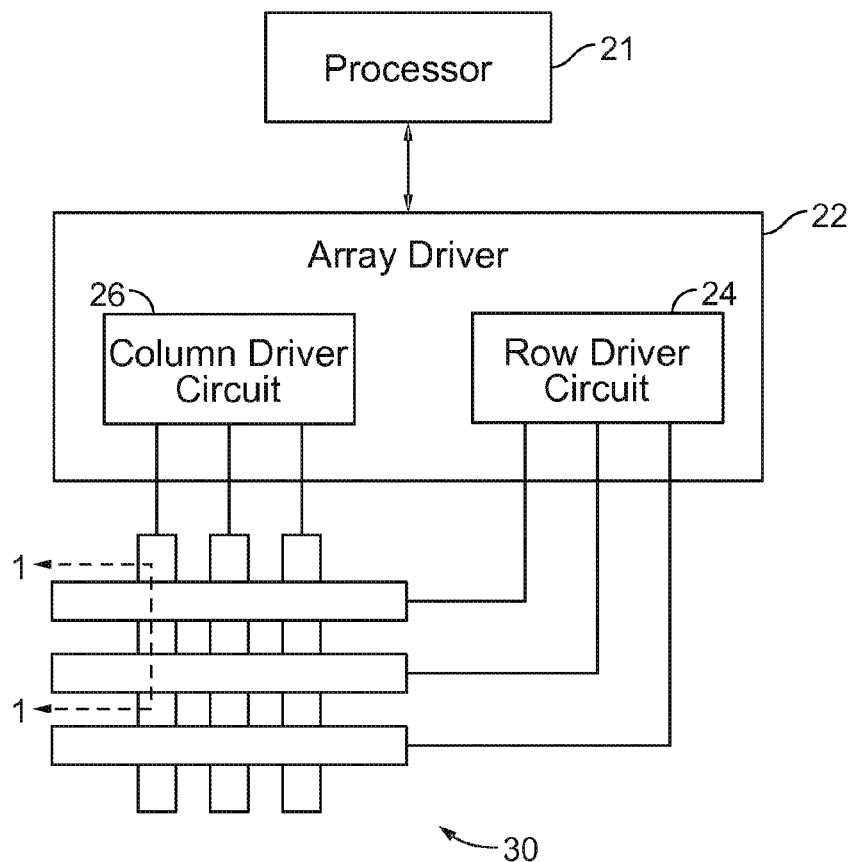
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
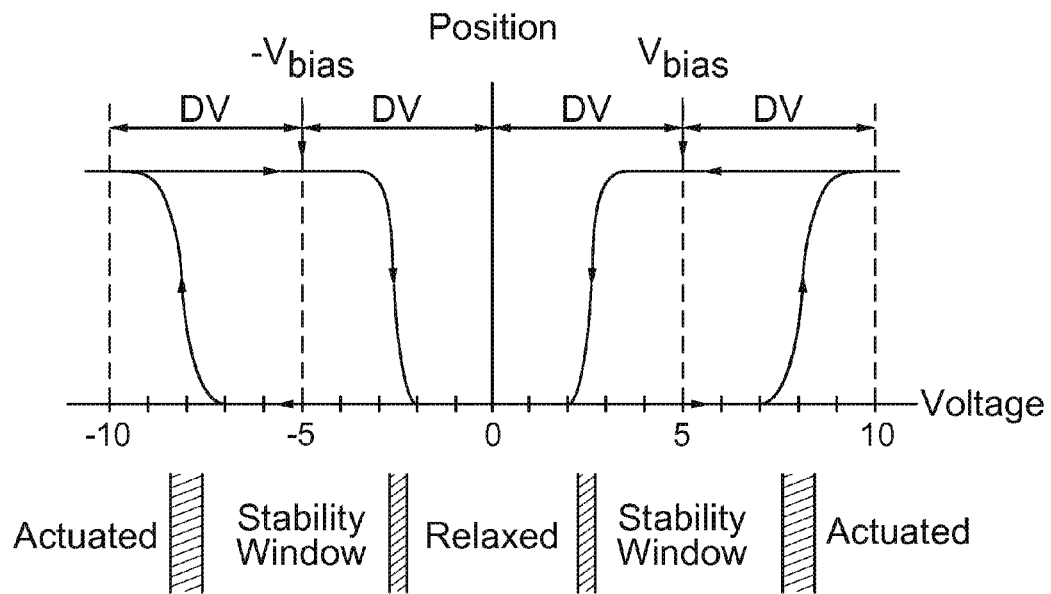
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10 volts, however, the movable reflective layer does not relax completely until the voltage drops below 2 volts. Thus, a range of voltage, approximately 3 to 7 volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10 volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7 volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
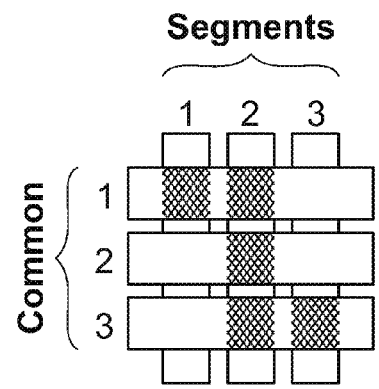
FIG. 5A shows an example of a diagram illustrating a frame of display data in the 3×3 interferometric modulator display of FIG. 2.
Figure 5B:
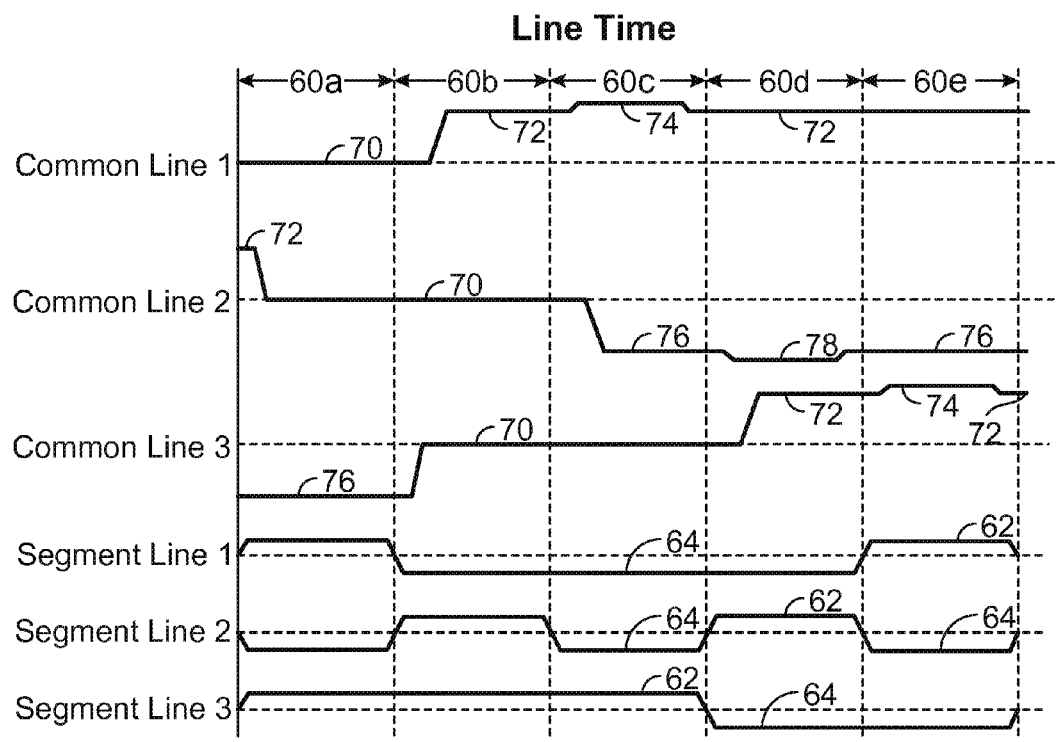
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a, a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$-relax and $VC_{HOLD\_L}$-stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
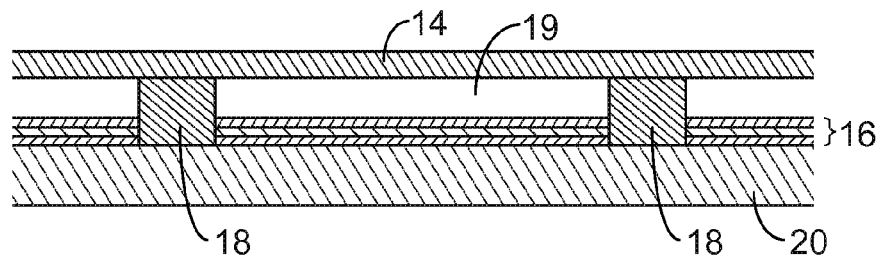
FIG. 6A shows an example of a partial cross-section of the interferometric modulator display of FIG. 1.
Figure 6B:
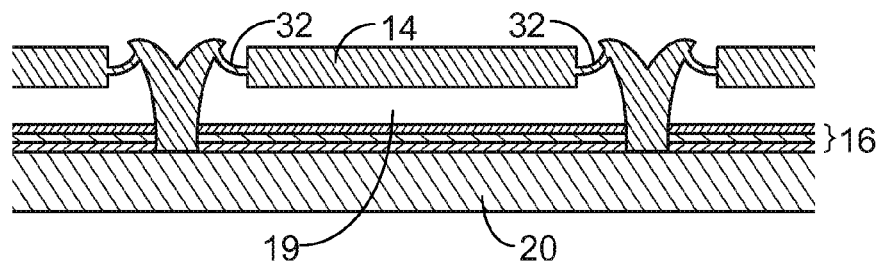
FIGS. 6B-6E show examples of cross-sections of varying implementations of interferometric modulators.
Figure 6C:
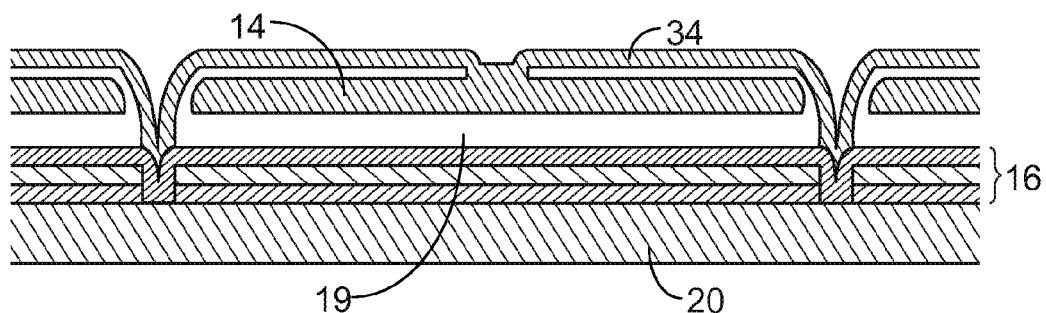

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
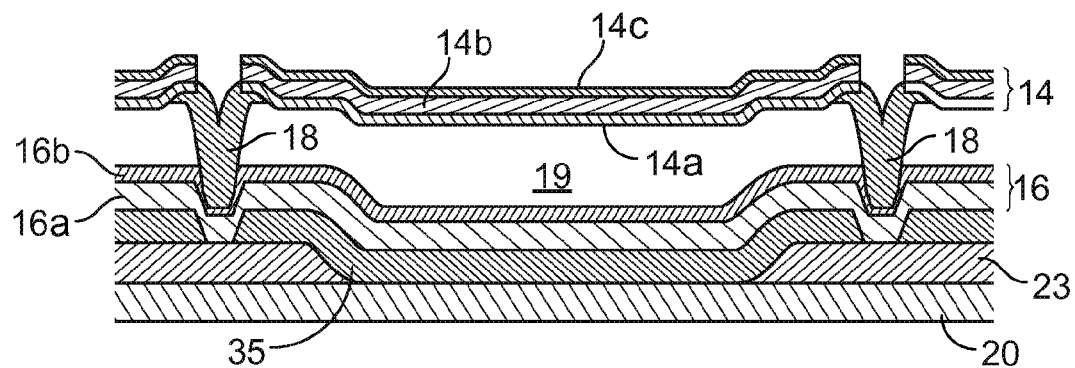

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, an $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, an $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane ($CFO_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
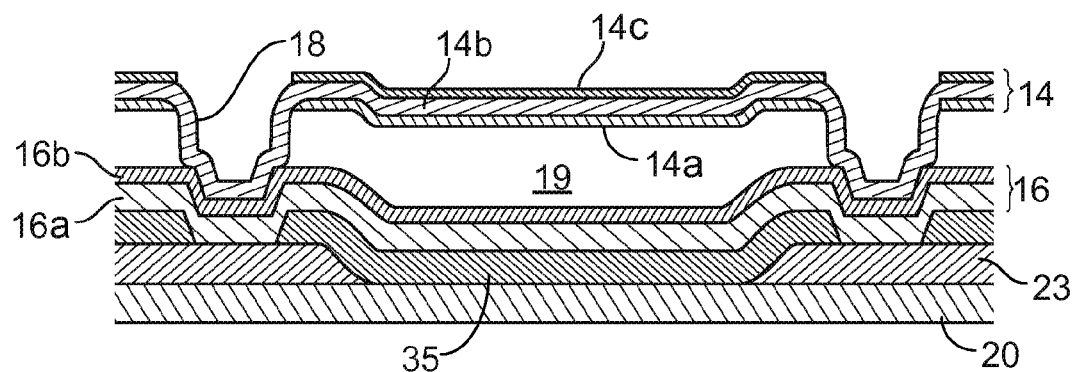

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
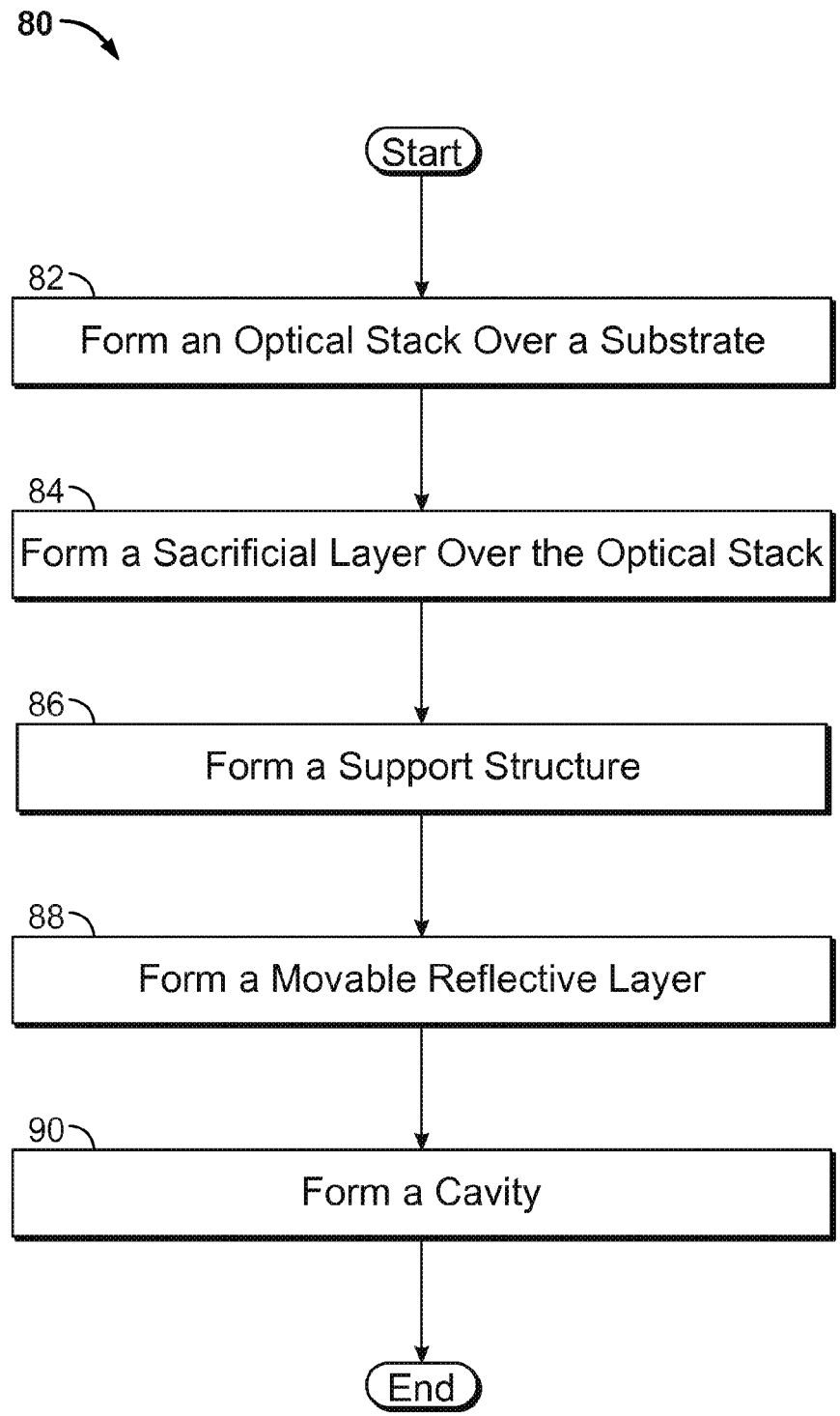
FIG. 7 shows an example of a flow diagram illustrating a manufacturing process for an interferometric modulator.
Figure 8A:
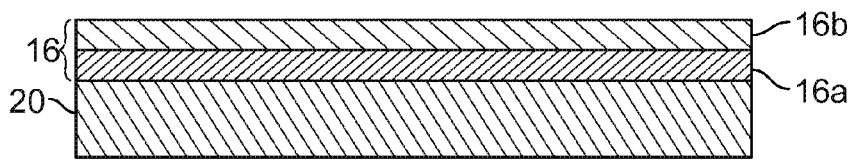
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
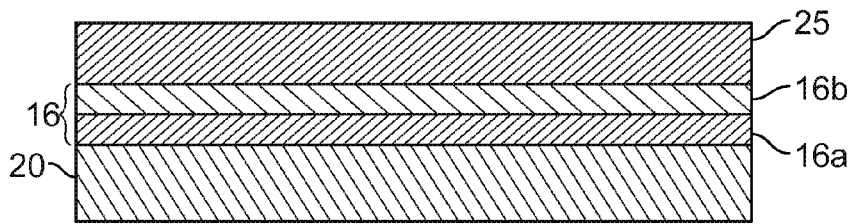

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
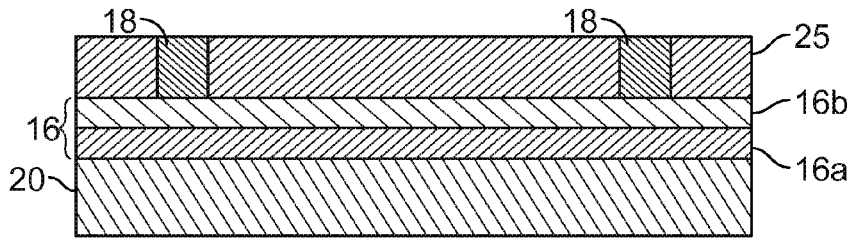

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning to remove portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
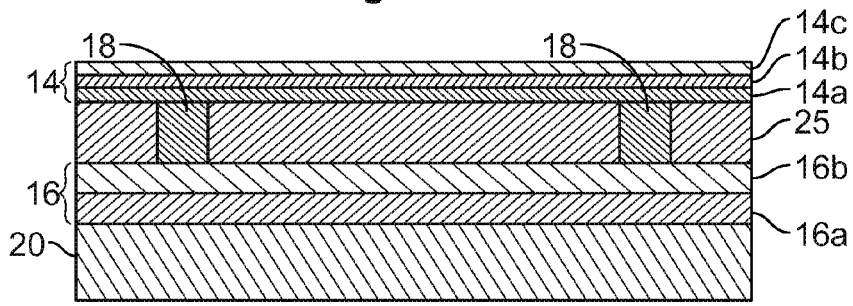
Figure 8E:
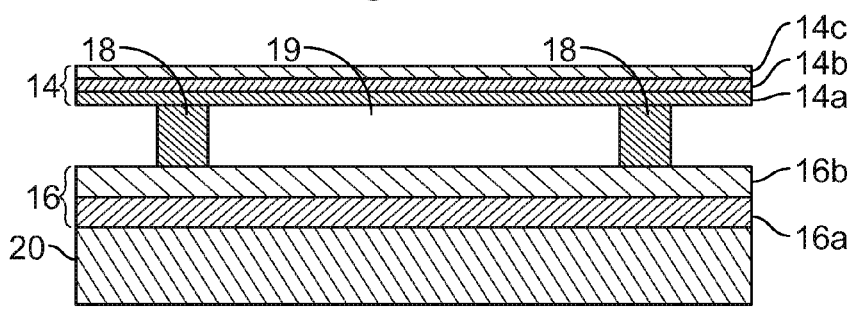

The process 80 continues at block 88 with the formation of a movable reflective layer or membrane such as the movable reflective layer 14 illustrated in FIGS. 1, 6 and 8D. The movable reflective layer 14 may be formed by employing one or more deposition processes, e.g., reflective layer (e.g., aluminum, aluminum alloy) deposition, along with one or more patterning, masking, and/or etching processes. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other combinations of etchable sacrificial material and etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Another example of an electromechanical systems device is a microphone. As noted above, a microphone is, in general, a device that converts sound waves into electrical signals. In some implementations, a small microphone having a wide dynamic range and a frequency response that spans the frequencies audible to humans may be used. In some implementations, one, two, or multiple microphones may be mounted, joined or otherwise connected to one or more EMS devices, such as an IMOD display device. In some implementations, one, two, or multiple microphones may be fabricated as part of an IMOD display device.

Figure 9A:
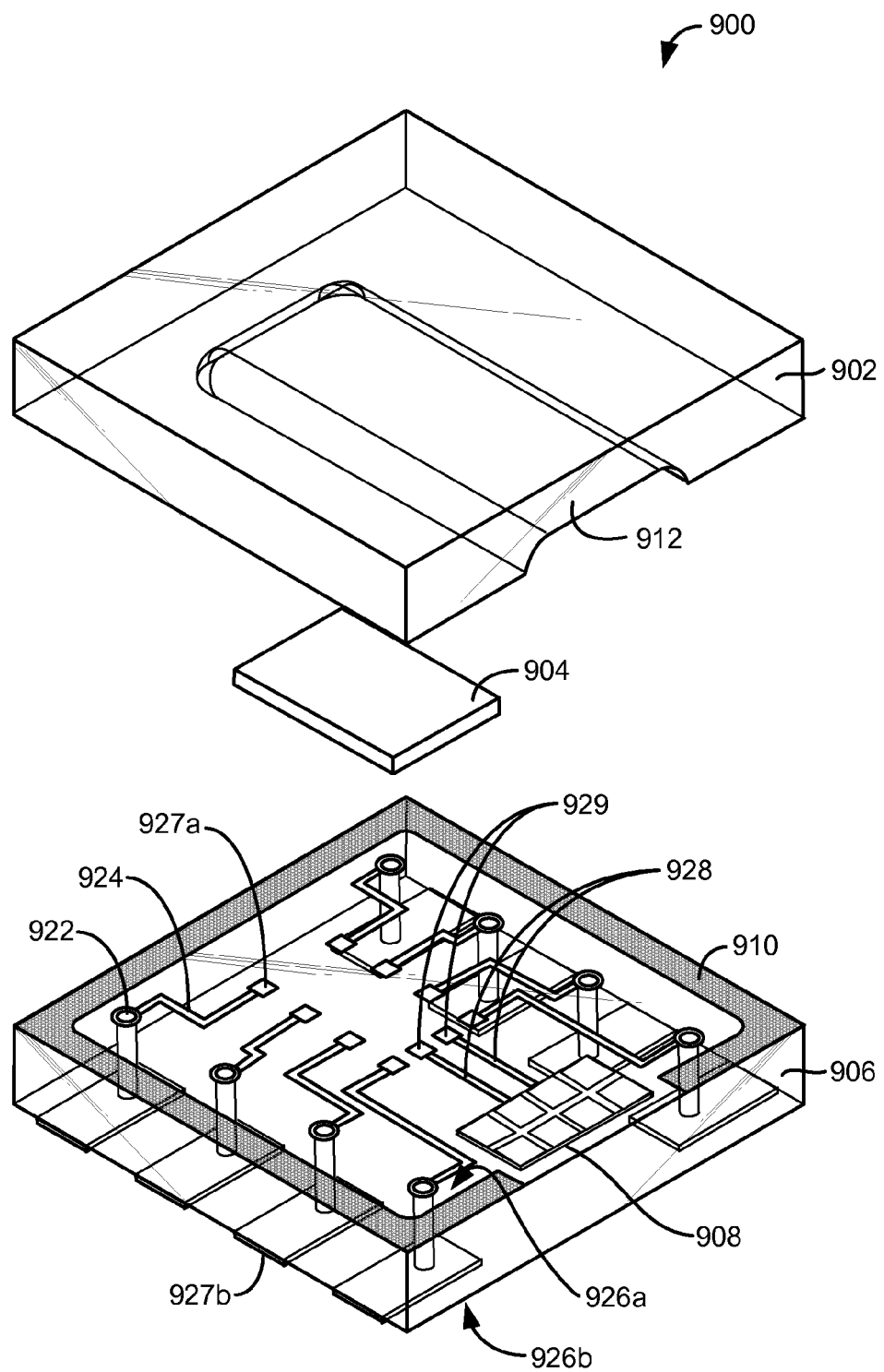
FIGS. 9A and 9B show examples of a glass-encapsulated microphone including an electromechanical microphone device on a glass substrate with a cover glass.
Figure 9B:
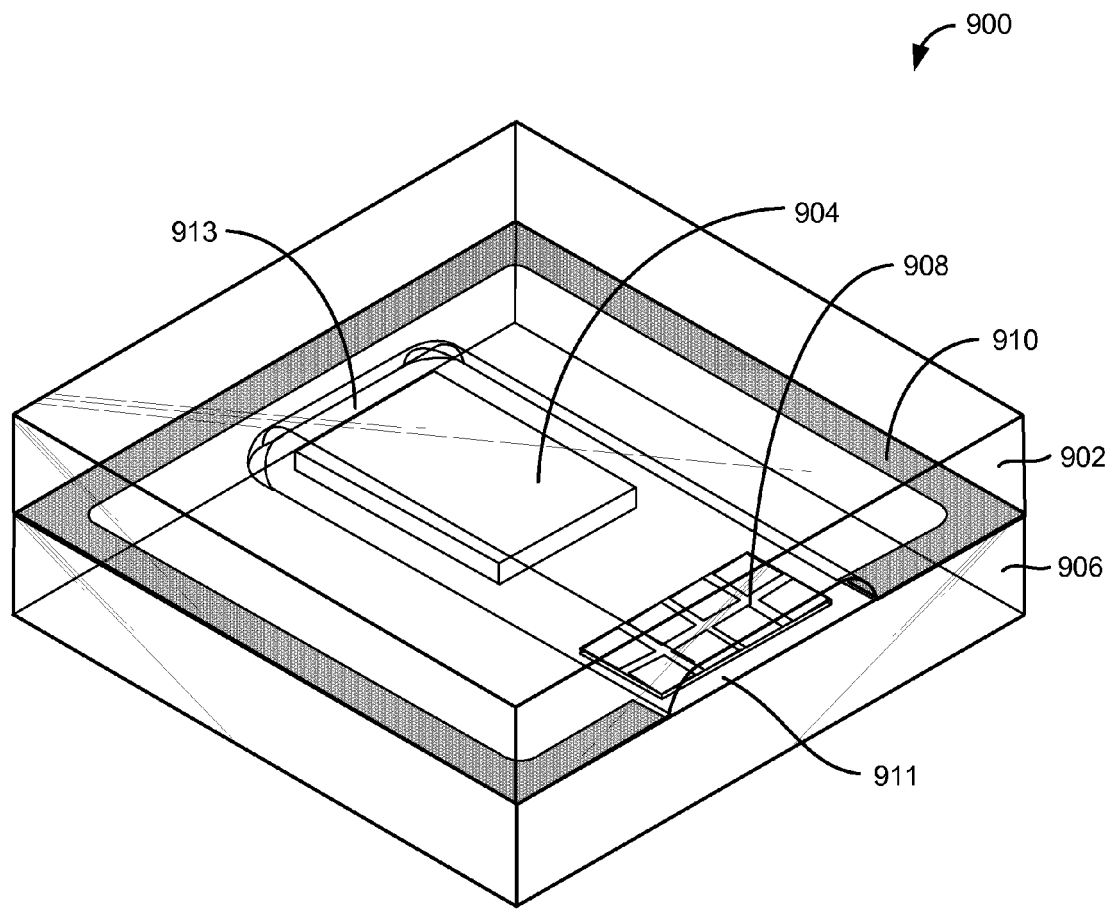

FIGS. 9A and 9B show examples of a glass-encapsulated microphone including an electromechanical microphone device on a glass substrate with a cover glass. FIG. 9A shows an example of an exploded view diagram of the glass-encapsulated microphone. FIG. 9B shows an example of a simplified isometric view of the glass-encapsulated microphone shown in FIG. 9A. For clarity, some components shown in FIG. 9A are not shown in FIG. 9B.

The glass-encapsulated microphone 900 shown in the example of FIGS. 9A and 9B includes a cover glass 902, an integrated circuit device 904, a glass substrate 906, an electromechanical microphone device 908, and a joining ring 910. While the cover glass 902 and the glass substrate 906 are depicted as transparent in the associated figures, the cover glass and the glass substrate may be transparent or non-transparent. For example, the cover glass and the glass substrate may be frosted, painted, or otherwise made opaque.

The cover glass is generally a planar substrate having two major substantially parallel surfaces and one or more recesses. The cover glass 902 includes a recess 912 as shown in FIG. 9A. When the cover glass 902 is bonded to the glass substrate 906, a cavity 913 is formed as shown in FIG. 9B. With respect to glass-encapsulated microphones, a cavity is an open volume in a glass-encapsulated microphone that may accommodate different components of the glass-encapsulated microphone. The cavity 913 accommodates the integrated circuit device 904 and the electromechanical microphone device 908. A portion of the recess 912 of the cover glass 902 is also at an edge of the cover glass. When the cover glass 902 is bonded to the glass substrate 906, an aperture 911 is formed. The aperture 911 allows a sound wave to interact with the electromechanical microphone device 908. In some implementations, the aperture 911 is designed such that it does not act as an acoustic cutoff for a sound wave in the frequency range to be sensed by the glass-encapsulated microphone 900. For example, the electromechanical microphone device 908 can be positioned in the recess 912 close to the side or edge of the cover glass 902 to reduce attenuation of low-frequency sound that can occur when the acoustic cavity above the microphone device becomes small compared to the wavelength of a sound wave.

As shown in FIG. 9B, the aperture 911 is on a single side of the glass-encapsulated microphone 900. In some implementations, this imparts a degree of directionality to the glass-encapsulated microphone 900. For example, the glass-encapsulated microphone 900 may be more sensitive to a sound when the aperture 911 is pointing approximately in the direction of the source of the sound. Such a configuration also may reduce the ambient noise sensed by the electromechanical microphone device 908. In some other implementations, multiple apertures may be formed on two or more sides of a glass-encapsulated microphone.

In some implementations, the length and the width of the cover glass may be the same or approximately the same as the length and the width of the glass substrate. For example, a length of the cover glass may be about 1 to 5 millimeters, and a width of the cover glass may be about 1 to 5 millimeters. In some implementations, the cover glass and the glass substrate may have approximately the same dimensions and may be rectangular or a square. In some other implementations, the cover glass and the glass substrate may have approximately the same dimensions and may be circular, an oval, or another shape. In various implementations, the cover glass can be about 100 to 700 micrometers thick, or more specifically, about 100 to 300 micrometers thick, about 300 to 500 micrometers thick, or about 500 micrometers thick. When the cover glass 902 is bonded to the glass substrate 906, the aperture 911 may be about 100 to 300 micrometers high in some implementations. The aperture width may be about ⅓ to ½ the width of the cover glass in some implementations. For example, in some implementations, the aperture may be about 1 mm wide. In some implementations, the aperture may be about 20 micrometers wide. In some other implementations, other dimensions for the aperture also may be used.

In some implementations, when the cover glass 902 is bonded to the glass substrate 906, multiple apertures, each smaller that the entire width of the cavity 913 that is formed when the cover glass is bonded to the glass substrate, may be formed. For example, multiple apertures that are each about 20 micrometers to 100 micrometers wide may be formed with a cavity having a width of about 1 millimeter. Multiple apertures may be formed with a cover glass having a recess with slits leading to the recess at an edge of the cover glass. When such a cover glass is bonded to the glass substrate, the slits may form the multiple apertures. In some implementations, the multiple apertures may be arranged as a grating. Each aperture may be about 20 micrometers to 100 micrometers wide over about a 1 millimeter length, for example. In some implementations, a number of smaller apertures may provide protection for the electromechanical microphone device 908 against dust, dirt, or other environmental elements.

The integrated circuit device 904 can be configured to sense output from the electromechanical microphone device 908 and can be disposed on the glass substrate 906. In some implementations, the integrated circuit device 904 may perform signal processing on output sensed from the electromechanical microphone device 908. In some implementations, the integrated circuit device 904 may be an application-specific integrated circuit (ASIC). In some implementations, the integrated circuit device 904 is flip-chip or wire bonded to appropriate bonds pads on the glass substrate 906. In some other implementations, the integrated circuit device 904 may be fabricated on the surface of the glass substrate 906.

The glass substrate 906 is generally a planar substrate having two substantially parallel surfaces, a top surface 926a and a bottom surface 926b. Through-glass vias 922 provide conductive pathways between portions of the top surface 926a and the bottom surface 926b through the glass substrate 906. Conductive topside traces 924 on the top surface 926a connect the though-glass vias 922 to topside bond pads 927a, which may be used for connections to the integrated circuit device 904. Bottomside bond pads 927b on the bottom surface 926b provide bottomside electrical connections to the through-glass vias 922. The electromechanical microphone device 908 and the integrated circuit device 904 may be electrically connected to one or more of the though-glass vias 922 directly or indirectly by the topside traces 924 on the glass substrate 906. In the example shown, topside traces 928 connect the electromechanical microphone device 908 to bond pads 929; the bond pads 929 may be used for connections to the integrated circuit device 904. The through-glass vias 922 thus provide direct electrical connection from one or more traces, bond pads, integrated circuit devices, electromechanical microphone devices, and/or other components on one side of the glass substrate 906 to one or more traces, bond pads, and/or other components on the opposing side.

The particular arrangement of the through-glass vias 922, the traces 924, and the bond pads 927a and 927b associated with the glass substrate 906 are an example of one possible arrangement, and a person having ordinary skill in the art would readily understand that other arrangements are possible. In the implementation shown in FIGS. 9A and 9B, the joining ring 910 surrounds the through-glass vias 922, the topside traces 924, and the topside bond pads 927a. In some other implementations, the joining ring 910 may overlay some of the topside traces 927a and/or some of the through-glass vias 922. Further description of glass substrates and electrically conductive through-glass vias may be found in U.S. patent application Ser. No. 13/048,768, entitled "THIN FILM THROUGH-GLASS VIA AND METHODS FOR FORMING SAME" and filed Mar. 15, 2011, which is hereby incorporated by reference.

In some implementations, portions of the conductive topside traces 924 on the top surface 926a that are exposed to the outside environment may be passivated. For example, the conductive topside traces may be passivated with a passivation layer, such as a coating of an oxide or a nitride. The passivation layer may prevent the conductive topside traces from becoming oxidized and possibly causing failure of the glass-encapsulated microphone 900. The passivation layer may be deposited with a chemical vapor deposition (CVD) process or a physical vapor deposition (PVD) process, or other appropriate techniques as known by one having ordinary skill in the art. Further, other exposed metal surfaces of the glass-encapsulated microphone 900 also may be passivated.

In some implementations, a length of the glass substrate 906 may be about 1 to 5 millimeters, and a width of the glass substrate 906 may be about 1 to 5 millimeters. In various implementations, the glass substrate 906 can be about 100 to 700 micrometers thick, about 100 to 300 micrometers thick, about 300 to 500 micrometers thick, or about 500 micrometers thick.

The joining ring 910 bonds the cover glass 902 to the glass substrate 906. The joining ring 910 may be shaped in any appropriate manner and is generally shaped and sized to correspond to the cover glass 902 and the glass substrate 906 to be joined. The joining ring 910 may include any number of different bonding materials. In some implementations, the joining ring 910 may be an adhesive. For example, the joining ring 910 may be an epoxy, including an ultraviolet (UV) curable epoxy or a heat-curable epoxy. In some implementations, the joining ring 910 may be a glass frit bond ring. In some other implementations, the joining ring 910 may be a metal bond ring. The metal bond ring may include a solderable metallurgy, a eutectic metallurgy, a solder paste, or the like. Examples of solderable metallurgies include nickel/gold (Ni/Au), nickel/palladium (Ni/Pd), nickel/palladium/gold (Ni/Pd/Au), copper (Cu), and gold (Au). Eutectic metal bonding involves forming a eutectic alloy layer between the cover glass 902 and the glass substrate 906. Examples of eutectic alloys that may be used include indium/bismuth (InBi), copper/tin (CuSn), and gold/tin (AuSn). Melting temperatures of these eutectic alloys are about 150° C. for the InBi eutectic alloy, about 225° C. for the CuSn eutectic alloy, and about 305° C. for the AuSn eutectic alloy.

The electromechanical microphone device 908 may be formed on or attached to the glass substrate 906. The electromechanical microphone device 908 may include any number of different sense elements, including piezoelectric sense elements, capacitive sense elements, and hybrid piezoelectric and capacitive sense elements. The different sense elements that may be included in an electromechanical microphone device are described further below. When in operation, sound waves deform a portion or portions of a sense element (not shown) of the electromechanical microphone device 908, which may be sensed by the integrated circuit device 904. The integrated circuit device 904 may process the signal from the electromechanical microphone device 908. For example, the integrated circuit device 904 can amplify and digitize the signal from the electromechanical microphone device 908.

In some implementations, the electromechanical microphone device 908 is located at a distance from the edge of the glass substrate 906 such that the glass substrate 906 and the cover glass 902 do not act as an acoustic cutoff. For example, the electromechanical microphone device 908 may be located about 10 to 300 micrometers from the edge of the glass substrate 906.

Figure 9C:
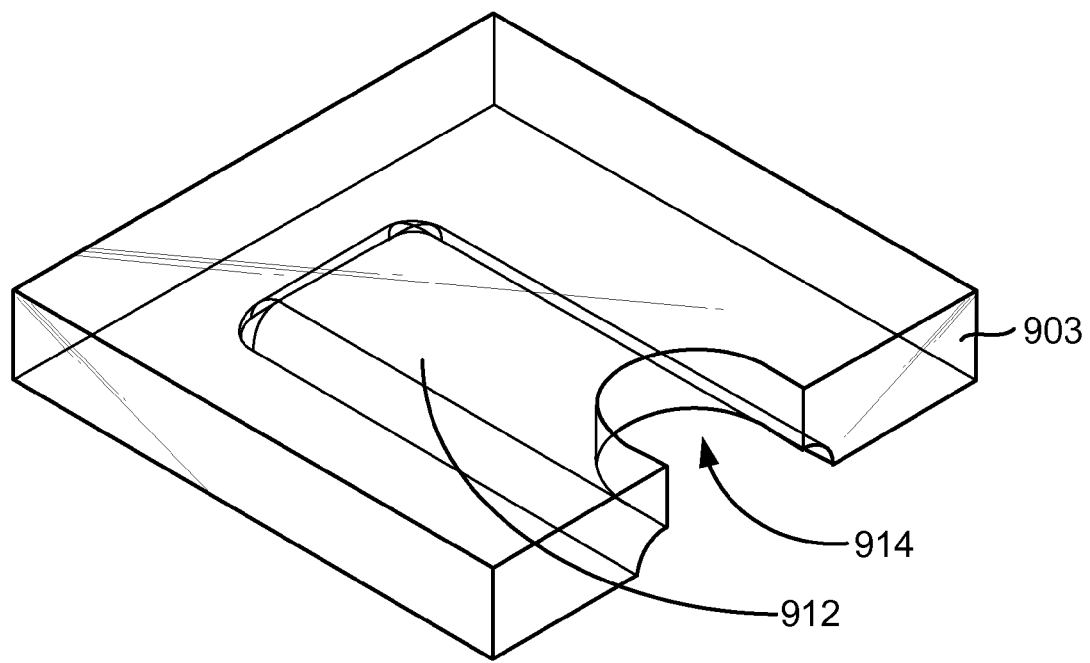
FIG. 9C shows an example of an alternative cover glass that may be used with the glass-encapsulated microphone shown in FIGS. 9A and 9B.

FIG. 9C shows an example of an alternative cover glass that may be used with the glass-encapsulated microphone shown in FIGS. 9A and 9B. The cover glass 903 shown in FIG. 9C includes a recess 912 and a cutout 914. The cutout 914 exposes the electromechanical device 908 on two of the eight sides of the glass-encapsulated microphone 900, increasing the exposure of the electromechanical microphone device 908 to the environment. In some implementations, the cover glass 903 as depicted in FIG. 9C can be used for increased sensitivity to sound waves and/or reduced or eliminated acoustic cutoffs.

In some implementations, the electromechanical microphone device 908 may be electrostatically shielded. For example, electrostatically shielding the electromechanical microphone device 908 may be important when the glass-encapsulated microphone 900 is operating in an environment with electromagnetic interference (EMI). EMI is a disturbance that affects an electrical circuit due to either electromagnetic induction or electromagnetic radiation emitted from an external source. Environments with electromagnetic interference may include a cellular or mobile telephone or other portable electronic device, for example.

In some implementations, the electromechanical microphone device 908 may be electrostatically shielded with a layer of metal (not shown) between the electromechanical microphone device 908 and the glass substrate 906, with the layer of metal typically being grounded. Metal layers such as aluminum (Al) or copper (Cu) layers with thicknesses on the order of about 0.01 to 1 micrometers or larger can provide adequate shielding. Other materials suitable for providing shielding include nickel (Ni), ruthenium (Ru), tungsten (W), platinum (Pt), molybdenum (Mo), titanium (Ti), and/or gold (Au). Transparent conductive oxides such as indium-tin-oxide (ITO) and aluminum-doped zinc oxide (AZO) or conductive polymers also may serve as electrostatic and electromagnetic shields. In some other implementations, the electromechanical microphone device 908 may be electrostatically shielded with a layer of metal (not shown) on portions of the cover glass 902 overlying the electromechanical microphone device 908, with the layer of metal typically being grounded. In some implementations, the electromechanical microphone device 908 may be electrostatically shielded with layers of metal (not shown) on portions of the cover glass 902 and the glass substrate 906 in the regions around the electromechanical microphone device 908, with the layers of metal typically being grounded.

Figure 10A:
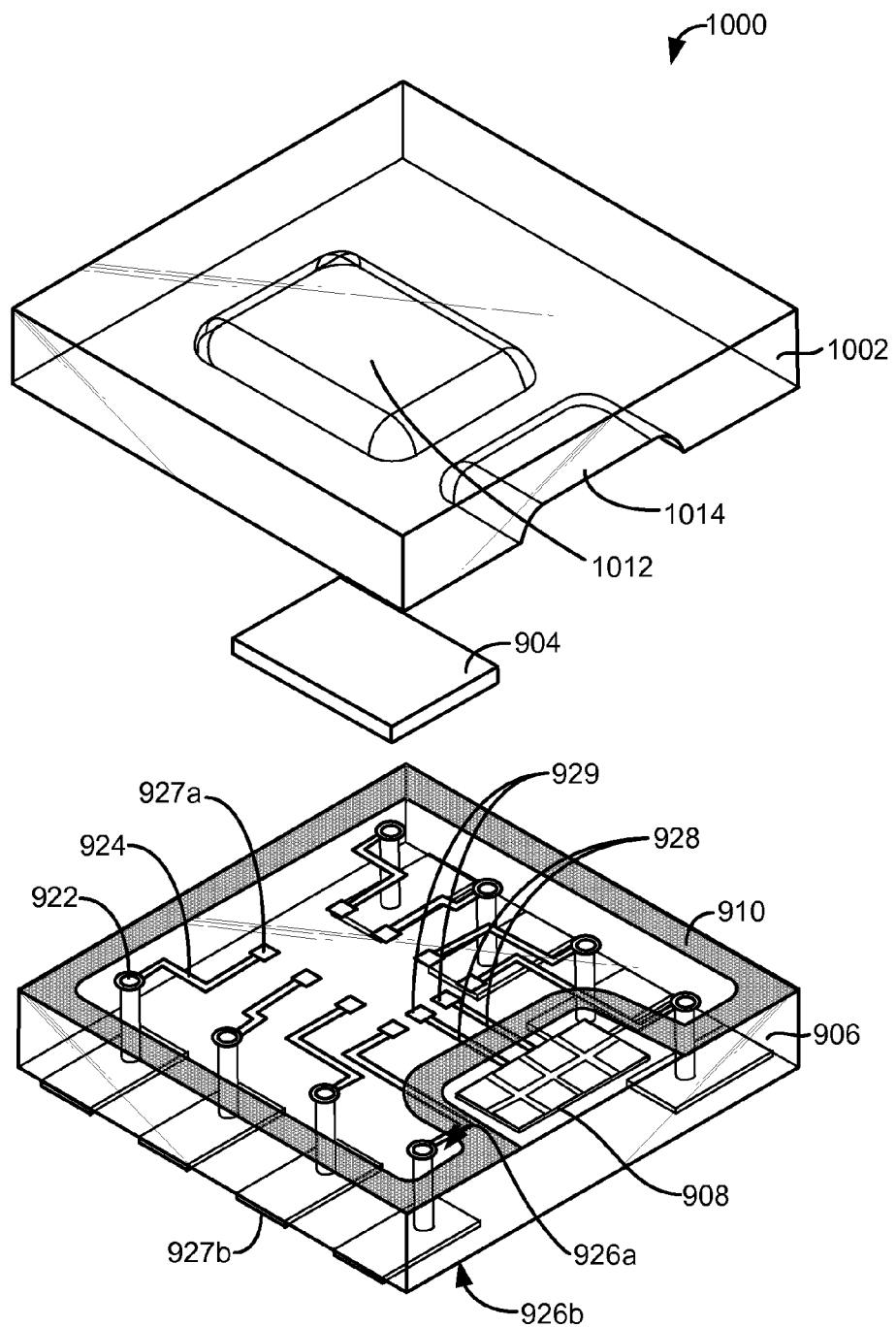
FIGS. 10A and 10B show examples of a glass-encapsulated microphone including an electromechanical microphone device on a glass substrate with a cover glass.
Figure 10B:
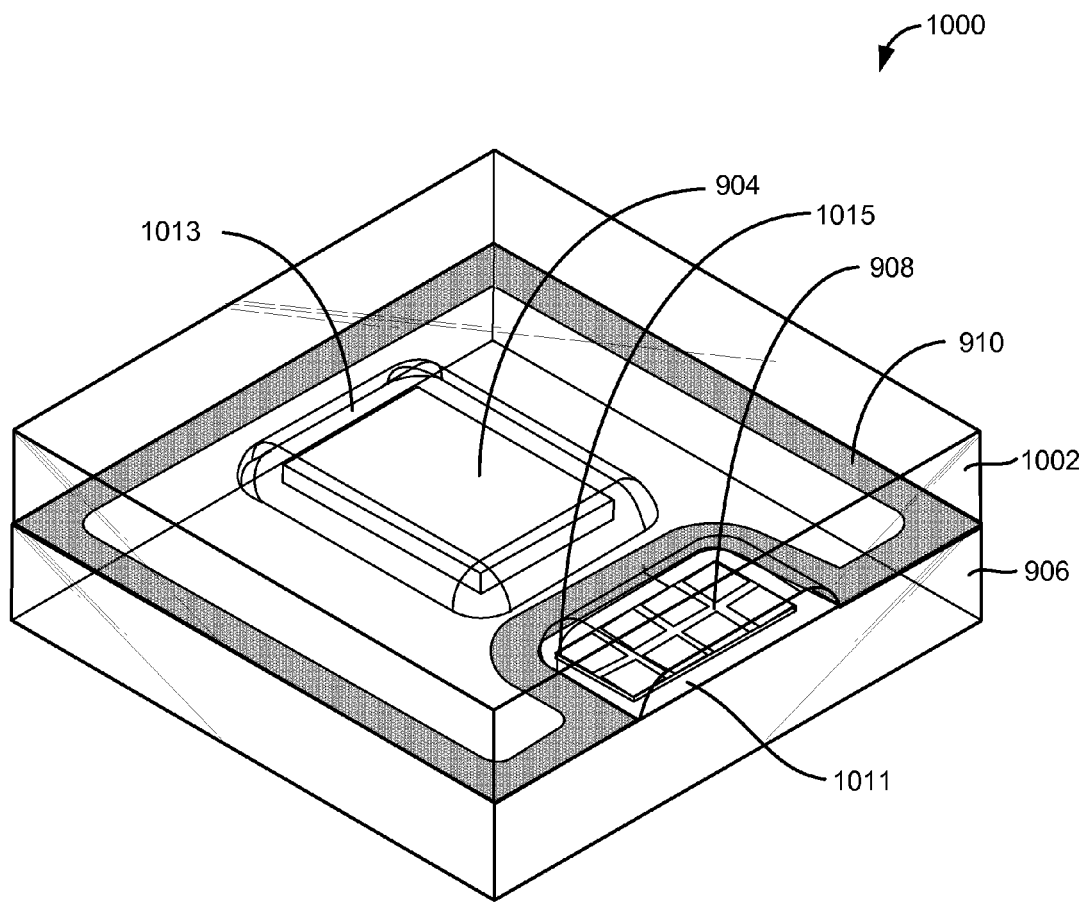

FIGS. 10A and 10B show examples of a glass-encapsulated microphone including an electromechanical microphone device on a glass substrate with a cover glass. FIG. 10A shows an example of an exploded view diagram of the glass-encapsulated microphone. FIG. 10B shows an example of a simplified isometric view of the glass-encapsulated microphone shown in FIG. 10A. For clarity, some components shown in FIG. 10A are not shown in FIG. 10B.

The glass-encapsulated microphone 1000 shown in FIGS. 10A and 10B includes a cover glass 1002, an integrated circuit device 904, a glass substrate 906, an electromechanical microphone device 908, and a joining ring 910.

The cover glass 1002 is generally a planar substrate having two major substantially parallel surfaces and one or more recesses. The cover glass 1002 includes a recess 1012 and a recess 1014 as shown in FIG. 10A. When the cover glass 1002 is bonded to the glass substrate 906, a cavity 1013 is formed by the recess 1012 and a cavity 1015 is formed by the recess 1014 as shown in FIG. 10B. The cavity 1015 accommodates the electromechanical microphone device 908. A portion of the recess 1014 of the cover glass 1002 is at an edge of the cover glass. When the cover glass 1002 is bonded to the glass substrate 906, an aperture 1011 is formed. In some implementations, the aperture 1011 is similar to the aperture 911 of the glass-encapsulated microphone 900. The aperture 1011 allows a sound wave to interact with the electromechanical microphone device 908. In some implementations, the aperture 1011 is designed such that it does not act as an acoustic cutoff for a sound wave in the frequency range to be sensed by the glass-encapsulated microphone 1000. For example, the electromechanical microphone device 908 can be positioned in the recess 1014 close to the side or edge of the cover glass 1002 to reduce attenuation of low-frequency sound that can occur when the acoustic cavity above the microphone device becomes small compared to the wavelength of a sound wave.

In some implementations, a length of the cover glass 1002 may be about 1 to 5 millimeters, and a width of the cover glass 1002 may be about 1 to 5 millimeters. In some implementations, the length and the width of the cover glass 1002 may be the same or approximately the same as the length and the width of the glass substrate 906. In some implementations, the cover glass and the glass substrate may have approximately the same dimensions and may be rectangular or a square. In some other implementations, the cover glass and the glass substrate may have approximately the same dimensions and may be circular, an oval, or another shape. In various implementations, the cover glass 1002 can be about 100 to 700 micrometers thick, about 100 to 300 micrometers thick, about 300 to 500 micrometers thick, or about 500 micrometers thick. When the cover glass 1002 is bonded to the glass substrate 906, the aperture 1011 may be about 100 to 300 micrometers high, in some implementations. The aperture width may be about ⅓ to ½ the width of the cover glass 1002, in some implementations. For example, in some implementations, the aperture 1011 may be about 1 mm wide. In some implementations, the aperture 1011 may be about 20 micrometers wide. In some other implementations, the aperture 1011 may include one or more openings that may be about 20 to 100 micrometers wide. In some other implementations, other dimensions for the aperture also may be used.

The cavity 1013 can accommodate the integrated circuit device 904. With the cover glass 1002 attached to the glass substrate 906 via a continuous joining ring 910 that surrounds a perimeter of the cavity 1013, the integrated circuit device 904 may be physically isolated from the electromechanical microphone device 908. This may serve to protect the integrated circuit device 904 from the environment.

Different implementations of the cover glass 1002 may be used while still physically isolating the integrated circuit device 904 from the electromechanical microphone device 908. For example, the cover glass 1002 may include a cutout, similar to the cutout 914 in the cover glass 903.

The joining ring 910 bonds the cover glass 1002 to the glass substrate 906. The joining ring 910 may include any number of different bonding materials, as described above. In some implementations, when the joining ring 910 is a metal bond ring bonding the cover glass 1002 to the glass substrate 906, the topside traces 928 electrically connecting the integrated circuit device 904 to the electromechanical microphone device 908 may be electrically insulated from the metal bond ring. For example, the topside traces 928 may be electrically insulated by a passivation layer, as described above.

In some implementations, the joining ring 910 forms a continuous ring around the integrated circuit device 904. In some implementations, the joining ring 910 may hermetically seal the integrated circuit device 904; a hermetic seal is a seal that does not readily permit the flow of gasses. Thus, when the integrated circuit device 904 is hermetically sealed by the joining ring 910, the integrated circuit device 904 is not exposed to gasses in the environment. In some implementations, a metal bond ring may be used to form a hermetic seal. In some other implementations, the joining ring 910 may form a non-hermetic seal. For example, an adhesive may form a non-hermetic seal.

Other components of the glass-encapsulated microphone 1000 are described further herein. The integrated circuit device 904 can be configured to sense output from the electromechanical microphone device 908 and can be disposed on the glass substrate 906. The glass substrate 906 is generally a planar substrate having two substantially parallel surfaces and may include through-glass vias. The electromechanical microphone device 908 may include any number of different sense elements, including piezoelectric sense elements, capacitive sense elements, and hybrid piezoelectric and capacitive sense elements.

Figure 11A:
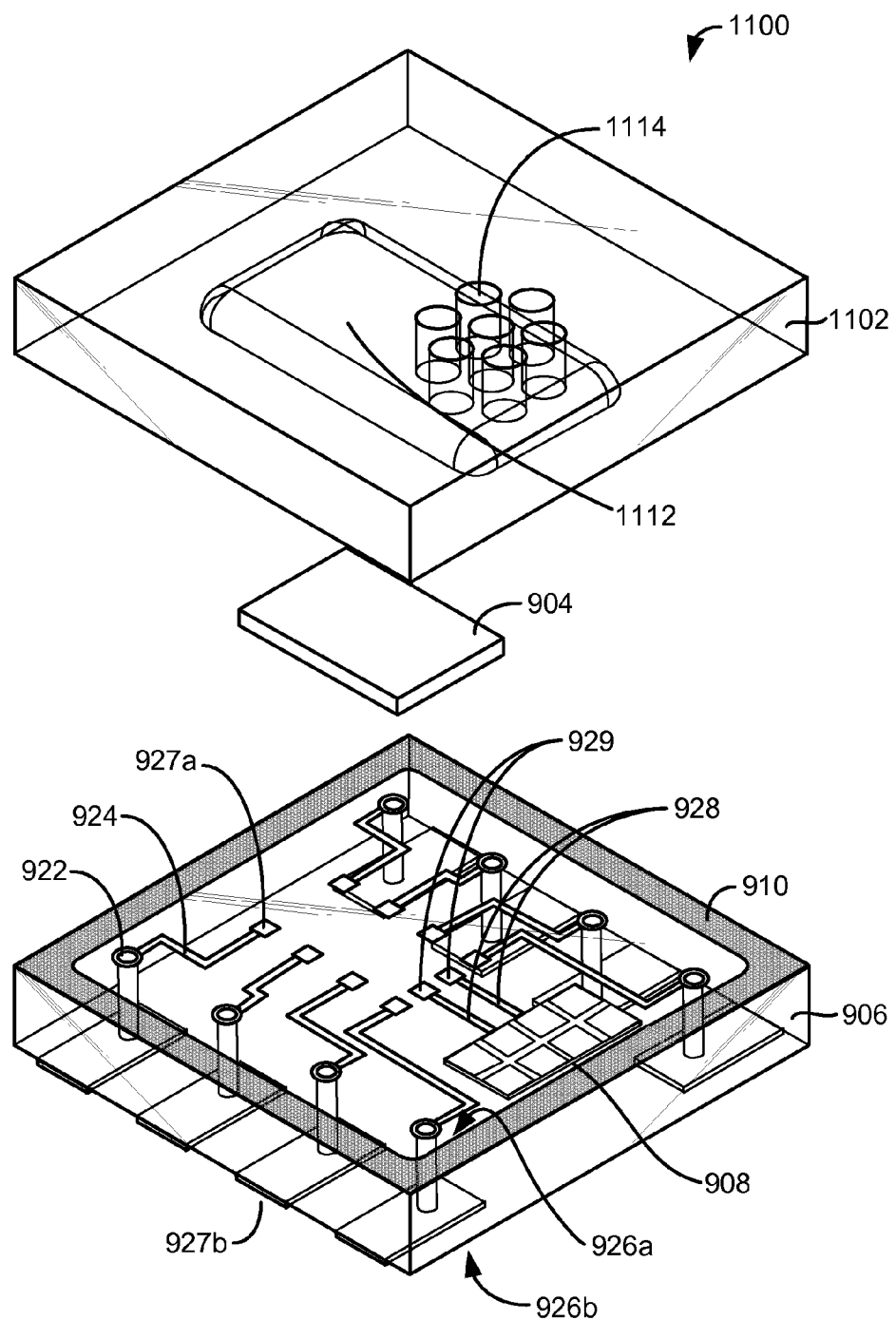
FIGS. 11A and 11B show examples of a glass-encapsulated microphone including an electromechanical microphone device on a glass substrate with a cover glass.
Figure 11B:
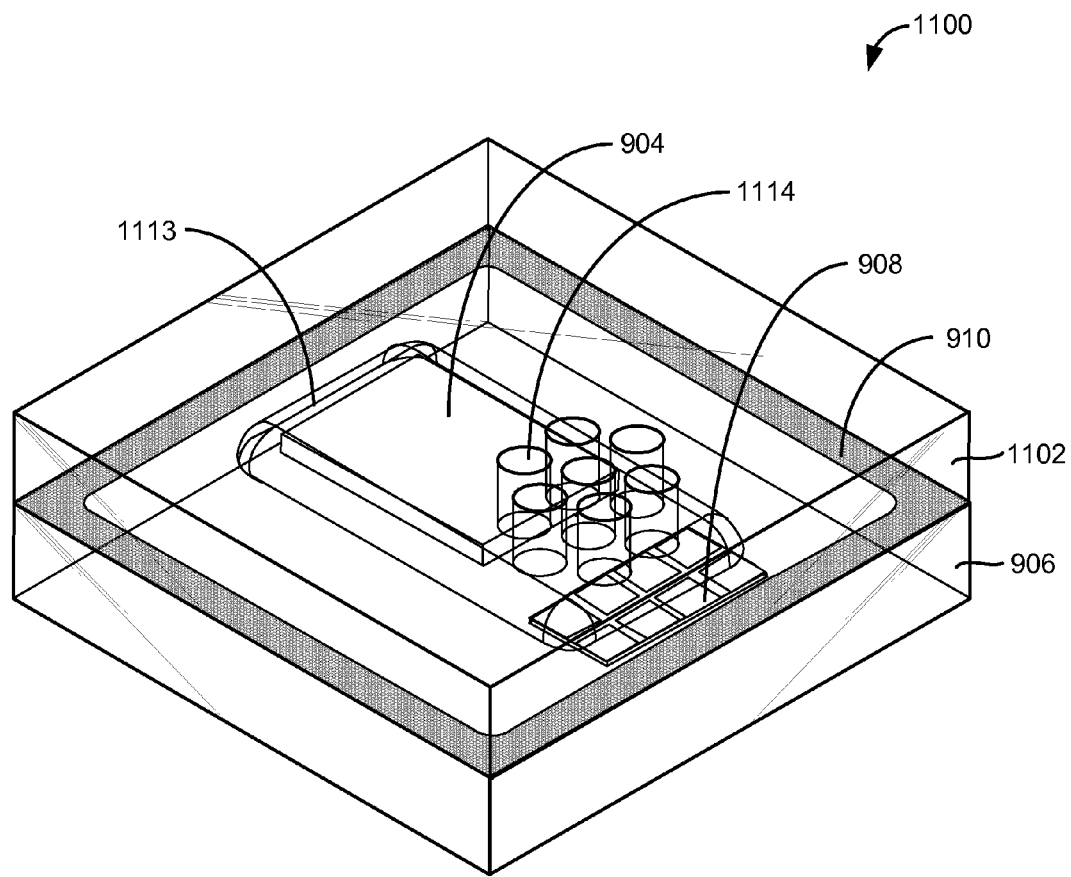

FIGS. 11A and 11B show examples of a glass-encapsulated microphone including an electromechanical microphone device on a glass substrate with a cover glass. FIG. 11A shows an example of an exploded view diagram of the glass-encapsulated microphone. FIG. 11B shows an example of a simplified isometric view of the glass-encapsulated microphone shown in FIG. 11A. For clarity, some components shown in FIG. 11A are not shown in FIG. 11B.

The glass-encapsulated microphone 1100 shown in FIGS. 11A and 11B includes a cover glass 1102, an integrated circuit device 904, a glass substrate 906, an electromechanical microphone device 908, and a joining ring 910.

The cover glass 1102 is generally a planar substrate having two major substantially parallel surfaces and one or more recesses. The cover glass 1102 includes a recess 1112 and ports 1114 as shown in FIG. 11A. When the cover glass 1102 is bonded to the glass substrate 906, a cavity 1113 is formed by the recess 1112 as shown in FIG. 11B. The cavity 1113 can accommodate the integrated circuit device 904 and the electromechanical microphone device 908. The cover glass 1102 includes the ports 1114 to allow a sound wave to interact with the electromechanical microphone device 908. The ports 1114 may be in a number of different configurations, including multiple holes, tapered holes, or one or more slots, for example. The ports 1114 also may be in any of a number of different shapes, including circular, rectangular, or triangular, for example. In some implementations, the ports 1114 are designed such that they do not act as an acoustic cutoff for a sound wave in the frequency range to be sensed by the glass-encapsulated microphone 1100. For example, the diameter of each of the ports 1114 may be large enough and the depth of each of the ports 1114 may be thin enough to allow moderately low, medium, and high frequency sound to pass while rolling off sound waves at low frequencies.

In some implementations, a length of the cover glass 1102 may be about 1 to 5 millimeters, and a width of the cover glass 1102 may be about 1 to 5 millimeters. In some implementations, the length and the width of the cover glass 1102 may be the same or approximately the same as the length and the width of the glass substrate 906. In some implementations, the cover glass and the glass substrate may have approximately the same dimensions and may be rectangular or a square. In some other implementations, the cover glass and the glass substrate may have approximately the same dimensions and may be circular, an oval, or another shape. In various implementations, the cover glass 1102 can be about 100 to 700 micrometers thick, about 100 to 300 micrometers thick, about 300 to 500 micrometers thick, or about 500 micrometers thick.

Different implementations of the cover glass 1102 may be used. For example, the cover glass 1102 may include two cavities: one cavity to accommodate the integrated circuit device 904 and one cavity to accommodate the electromechanical microphone device 908, such that the integrated circuit device 904 is physically isolated from the electromechanical microphone device 908, similar to the cover glass 1002 illustrated in FIGS. 10A and 10B. Further, in some implementations, the cover glass 1102 may not include any ports, and the glass substrate 906 may include ports similar to the ports 1114. In some other implementations, both the cover glass 1102 and the glass substrate 906 may include ports. Still further, in some implementations, the cover glass 1102 may include a recess that forms an aperture, as described above, with one or more of the cover glass 1102 and the glass substrate 906 including ports.

Other components of the glass-encapsulated microphone 1100 are described further herein. The integrated circuit device 904 can be configured to sense output from the electromechanical microphone device 908 and can be disposed on the glass substrate 906. The joining ring 910 bonds the cover glass 1102 to the glass substrate 906. The joining ring 910 may include any number of different bonding materials. The glass substrate 906 is generally a planar substrate having two substantially parallel surfaces and may include through-glass vias 922. The electromechanical microphone device 908 may include any number of different sense elements, including piezoelectric sense elements, capacitive sense elements, and hybrid piezoelectric and capacitive sense elements.

Figure 12A:
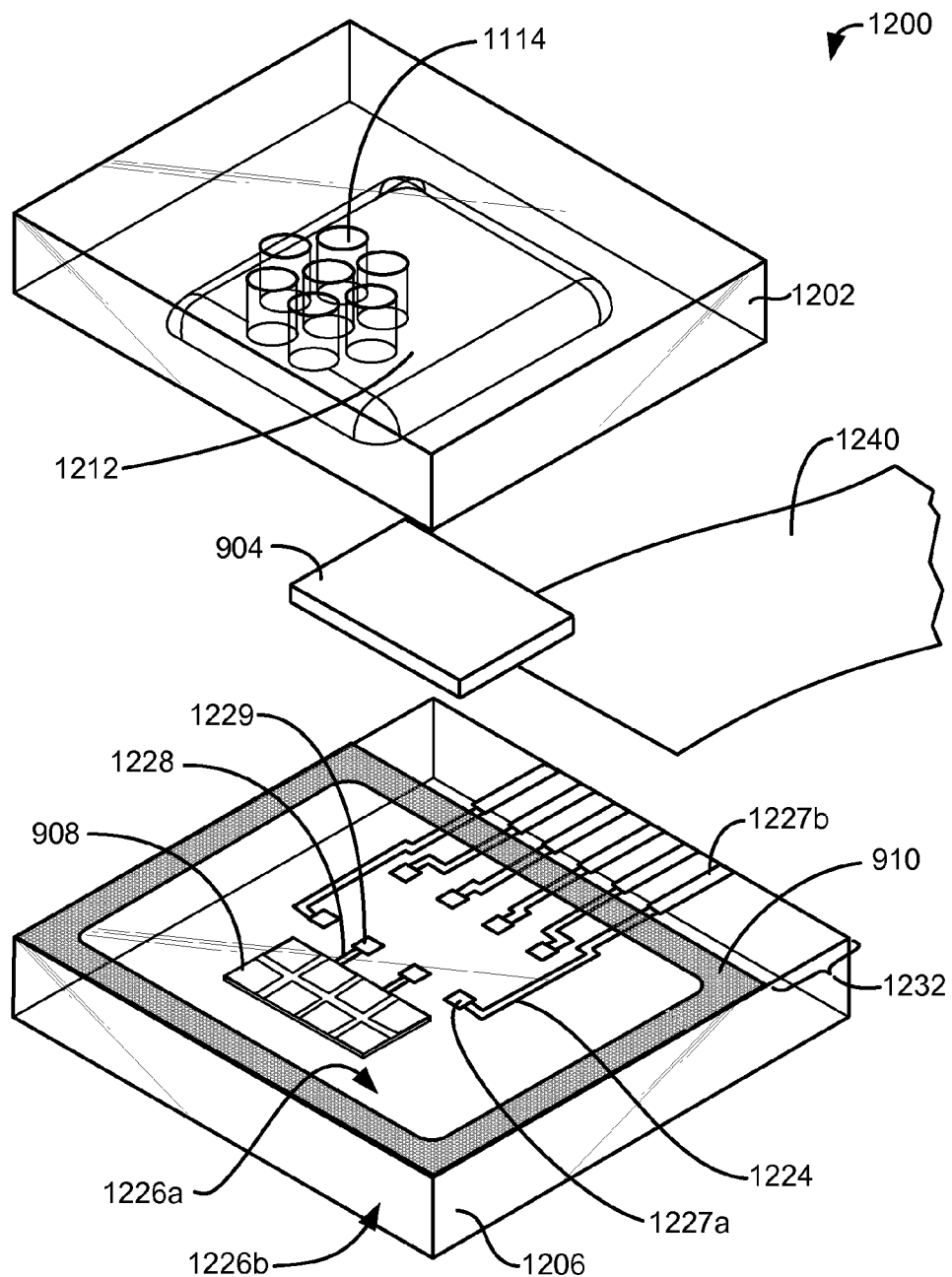
FIGS. 12A and 12B show examples of a glass-encapsulated microphone including an electromechanical microphone device on a glass substrate with a cover glass.
Figure 12B:
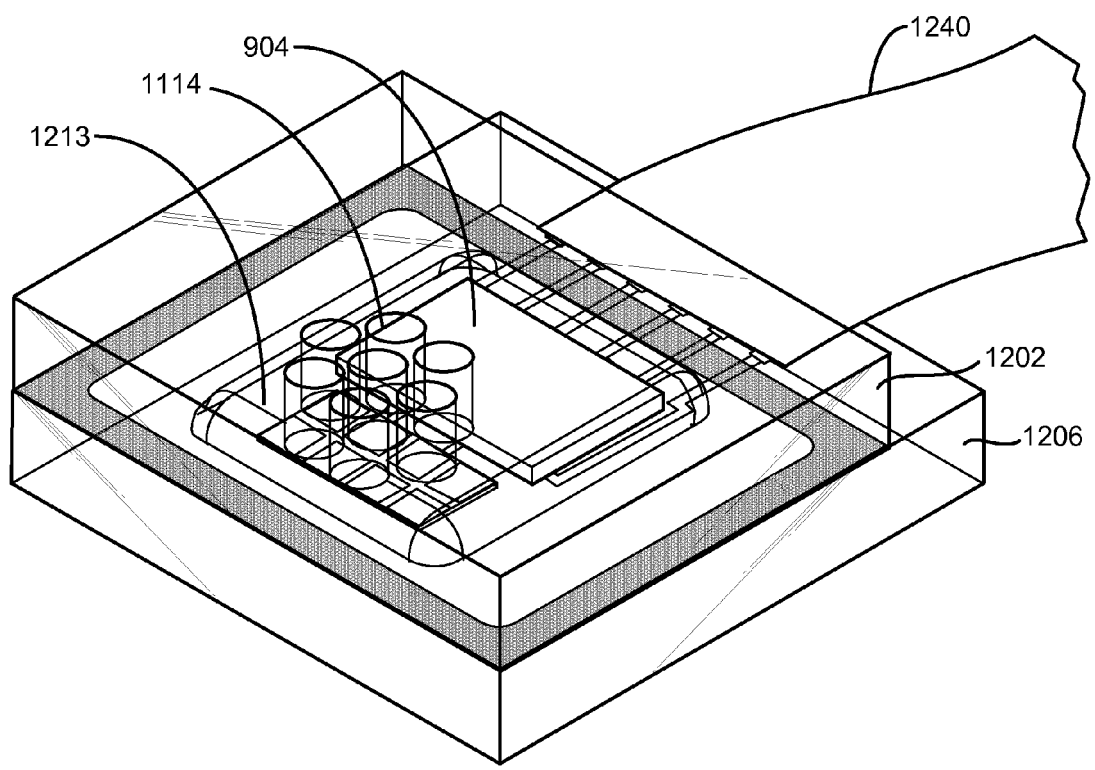

FIGS. 12A and 12B show examples of a glass-encapsulated microphone including an electromechanical microphone device on a glass substrate with a cover glass. FIG. 12A shows an example of an exploded view diagram of the glass-encapsulated microphone. FIG. 12B shows an example of an isometric view of the glass-encapsulated microphone shown in FIG. 12A.

The glass-encapsulated microphone 1200 shown in FIGS. 12A and 12B includes a cover glass 1202, an integrated circuit device 904, a glass substrate 1206, an electromechanical microphone device 908, and a joining ring 910. The cover glass 1202 includes a recess 1212 and ports 1114, similar to the cover glass 1102. Similar to the glass-encapsulated microphone 1100, when the cover glass 1202 is bonded to the glass substrate 1206, a cavity 1213 is formed by the recess 1212. Different implementations of the cover glass 1202 may be used, as described above.

The glass substrate 1206 is generally a planar substrate having two substantially parallel surfaces, a top surface 1226a and a bottom surface 1226b. A ledge 1232 allows for electrical connections to portions of the top surface 1226a enclosed by the cover glass 1202. Conductive traces 1224 on the top surface 1226a connect bond pads 1227a to ledge pads

1227*b*. The bond pads 1227*a* may be used for connections to the integrated circuit device 904. The electromechanical microphone device 908 and the integrated circuit device 904 may be electrically connected to one or more of the ledge pads 1227*b* directly or indirectly by the traces 1224 on the glass substrate 1206. In the example shown, traces 1228 connect the electromechanical microphone device 908 to bond pads 1229 and the bond pads 1229 may be used for connections to the integrated circuit device 904. The traces 1224 and 1228 thus provide electrical connection from one or more bond pads 1227*a* and 1229, integrated circuit devices 904, electromechanical microphone devices 908, or other components that may be enclosed by the cover glass 1202 to one or more ledge pads 1227*b* or other components. The particular arrangement of the traces, the bond pads, and the ledge pads associated with the glass substrate 1206 are an example of one possible arrangement, and a person having ordinary skill in the art would readily understand that other arrangements are possible.

In some implementations, portions of the conductive traces 1228 and/or 1224 on the top surface 1226*a* that are exposed to the outside environment may be passivated. For example, the conductive traces 1228 and/or 1224 may be passivated with a passivation layer, such as a coating of an oxide or a nitride.

The joining ring 910 bonds the cover glass 1202 to the glass substrate 1206. The joining ring 910 may include any number of different bonding materials, as described above. In some implementations, when the joining ring 910 is a metal bond ring bonding the cover glass 1202 to the glass substrate 1206, the traces 1224 electrically connecting the bond pads 1227*a* to the ledge pads 1227*b* may be electrically insulated from the metal bond ring. For example, the traces 1224 may be electrically insulated by a passivation layer, as described above.

Other components of the glass-encapsulated microphone 1200 are described further herein. The integrated circuit device 904 is configured to sense output from the electromechanical microphone device 908 and is disposed on the glass substrate 1206. The electromechanical microphone device 908 may include any number of different sense elements, including piezoelectric sense elements, capacitive sense elements, and hybrid piezoelectric and capacitive sense elements.

The glass-encapsulated microphone 1200 shown in FIGS. 12A and 12B may further include a flex tape 1240. A flex tape also may be referred to as a ribbon cable or a flexible flat cable. The flex tape 1240 may include a polymer film with embedded electrical connections, such as conducting wires or traces, running parallel to each other on the same flat plane. The flex tape 1240 also may include flex pads at one end, and contacts at the other end, with the conducting wires or traces electrically connecting individual flex pads with individual contacts. The flex pads may be on the bottom surface of the flex tape 1240, and are not shown in FIG. 12A or 12B. The flex pads may be configured to make contact with the ledge pads 1227*b*. In some implementations, the flex pads of the flex tape 1240 may be bonded to the ledge pads of the glass-encapsulated microphone 1200 with an anisotropic conductive film (ACF). In some other implementations, the flex pads of the flex tape 1240 may be bonded to the ledge pads of the glass-encapsulated microphone 1200 with solder. The contacts of the flex tape 1240 may be assembled in a socket or other connector, for example, for connection to a printed circuit board or other electronic component.

In some implementations, the glass-encapsulated microphone 1200 with a ledge 1232 for connection to a flex tape 1240 may allow the glass-encapsulated microphone 1200 to be located away from a printed circuit board or other electronic component. When the glass-encapsulated microphone 1200 is located away from a printed circuit board or other electronic component, the printed circuit board may be enclosed within a water resistant enclosure, improving the reliability of the electronic device incorporating the glass-encapsulated microphone and the printed circuit board. Further, the flex tape 1240 may allow the glass-encapsulated microphone 1200 to be mounted near where sound is expected, such as the mouthpiece of a mobile phone, for example. The use of a flex tape also obviates the need for electrical vias through the glass substrate, which may simplify the fabrication processes for the glass-encapsulated microphone 1200.

Figure 13:
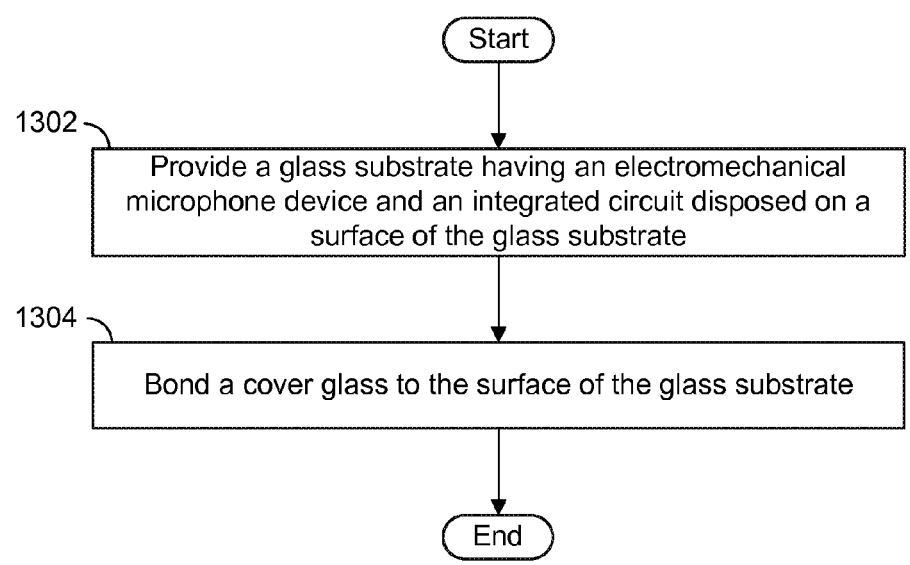
FIG. 13 shows an example of a flow diagram illustrating a manufacturing process for a glass-encapsulated microphone.

FIG. 13 shows an example of a flow diagram illustrating a manufacturing process for a glass-encapsulated microphone. At block 1302 of the process 1300, a glass substrate having an electromechanical microphone device on a surface of the glass substrate is provided. The glass substrate also may have an integrated circuit device disposed on the surface of the glass substrate. The glass substrate also may include though-glass vias, topside traces, and topside and bottomside bond pads, similar to the glass substrate 906. Alternatively, the glass substrate also may include traces, bond pads, and ledge pads, similar to the glass substrate 1206. The integrated circuit device may be configured to sense output from the electromechanical microphone device, similar to the glass-encapsulated microphones described herein.

At block 1304, a cover glass is bonded to the surface of the glass substrate. Some examples of the cover glass are described above, including the cover glass 902, the cover glass 1002, the cover glass 1102, or the cover glass 1202. Recesses in a cover glass may be formed with a chemical etching process or a sandblasting process. For example, in some implementations, the cover glass is similar to the cover glass 902, and includes the recess 912 that forms the cavity 913 when the cover glass is bonded to the surface of the glass substrate. The cavity 913 may be configured to accommodate the electromechanical microphone device. A portion of the recess 912 may be at an edge of the cover glass such that when the glass substrate and the cover glass are bonded, an aperture is formed.

As described above, the cover glass may be bonded to the glass substrate with a joining ring that may include any number of different bonding materials. In some implementations, the cover glass is bonded to the glass substrate with an adhesive. In some implementations, the cover glass is bonded to the glass substrate with a UV curable epoxy or a heat-curable epoxy. When epoxy is used to bond the cover glass to the glass substrate, the epoxy may be screened or dispensed around the edges of the cover glass or the glass substrate. Then, the cover glass and the glass substrate may be aligned and pressed together and UV light or heat may be applied to the epoxy to cure the epoxy.

In some other implementations, the cover glass is bonded to the glass substrate with a glass frit bond ring. Glass frit may be applied to the glass substrate, cover glass, or both using dispensing, shadow masking, or other appropriate techniques. When a glass frit bond ring is used to bond the cover glass to the glass substrate, heat and pressure may be applied to the cover glass, the glass substrate, and the glass frit bond ring when these components are in contact with one another such that glass frit bond ring melts and bonds the two glass pieces.

In some other implementations, the cover glass is bonded to the glass substrate with a metal bond ring. When a metal bond ring is used to bond the cover glass to the glass substrate, heat may be applied to the cover glass, the glass substrate, and the metal bond ring when these components are in contact with one another such that metal bond ring melts and bonds the two glass pieces.

While the process 1300 describes an example of a manufacturing process for a glass-encapsulated microphone, a plurality of glass-encapsulated microphones may be manufactured with the process 1300 with or without variations. For example, the substrate may include a plurality of electromechanical microphones devices and integrated circuit devices. Likewise, the cover glass may include a plurality of recesses. The cover glass may be bonded to the surface of the glass substrate, forming a sheet of glass-encapsulated microphones. The glass-encapsulated microphones may be then separated from one another. The glass-encapsulated microphones may be separated from one another by dicing with a diamond blade or a laser, by a scribe and break process, or other appropriate technique to cut the cover glass and the glass substrate.

As noted above, an electromechanical microphone device may include any number of different sense elements, including piezoelectric sense elements, capacitive sense elements, and hybrid piezoelectric and capacitive sense elements. In a piezoelectric sense element, a voltage is generated in a piezoelectric layer in proportion to the bending strain in the sense element caused by a sound wave. In some implementations, the piezoelectric layer can be offset from the neutral plane of the bending portion of the sense element to generate a net voltage in the piezoelectric material.

Figure 14A:
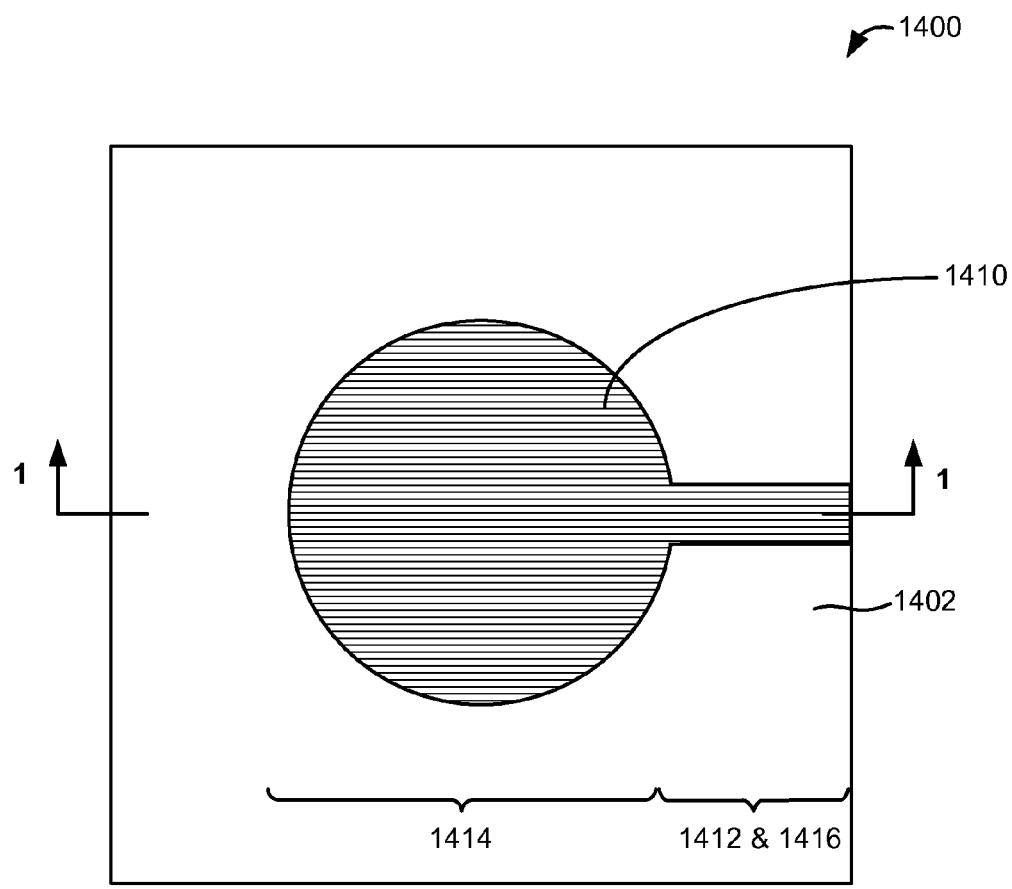
FIGS. 14A and 14B show examples of a sense element of an electromechanical microphone device.
Figure 14B:
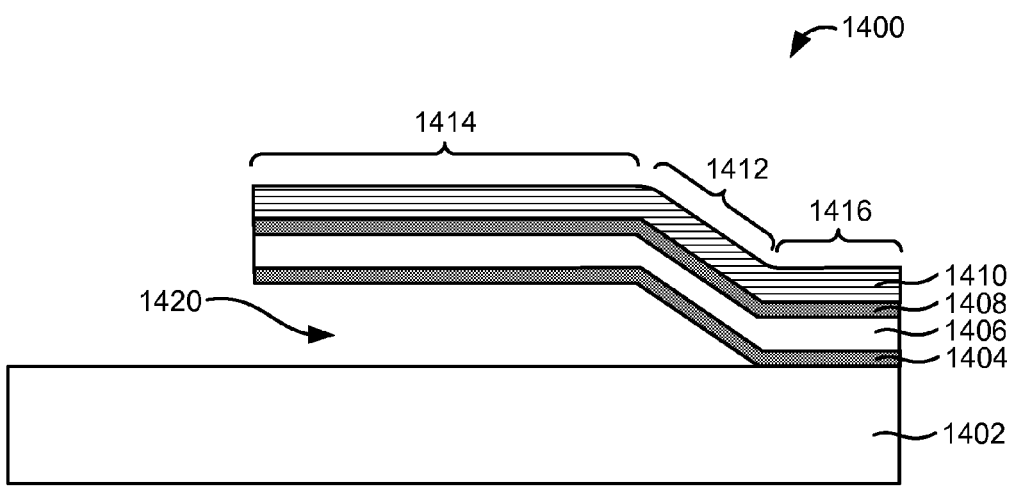

FIGS. 14A and 14B show examples of a sense element of an electromechanical microphone device. FIG. 14A shows an example of a top-down view of the sense element 1400. FIG. 14B shows an example of a cross-sectional schematic view of the sense element 1400 through line 1-1 of FIG. 14A.

The sense element 1400 shown in FIGS. 14A and 14B includes a glass substrate 1402, a first electrode layer 1404, a first piezoelectric layer 1406, a second electrode layer 1408, a second piezoelectric layer 1410, and an acoustic cavity 1420.

In some implementations, the glass substrate 1402 may be, e.g., the glass substrate 906 or the glass substrate 1206. That is, the sense element 1400 may be fabricated on the glass substrate that forms the glass-encapsulated microphone. In some other implementations, the sense element 1400 may be fabricated on a glass substrate and then that glass substrate may be incorporated into a glass-encapsulated microphone. For example, the sense element may be fabricated on a glass substrate that does not form the glass-encapsulated microphone and then may be adhered or otherwise attached to the glass-encapsulated microphone.

The first electrode layer 1404 and the second electrode layer 1408 serve to sense a voltage generated by the piezoelectric layer 1406. The first electrode layer 1404 and the second electrode layer 1408 may include one or more of a number of different metals, and combinations thereof. For example, in various implementations, the electrode layers 1404 and 1408 may include copper (Cu), nickel (Ni), ruthenium (Ru), tungsten (W), platinum (Pt), molybdenum (Mo), aluminum (Al), titanium (Ti), and/or gold (Au). In some implementations, the first electrode layer 1404 and the second electrode layer 1408 may be each about 50 to 300 nanometers thick.

As shown in FIG. 14B, at least a portion of a first electrode layer 1404 is disposed on, or attached to, the glass substrate 1402, and at least a portion of the first electrode layer 1404 is suspended over, detached from, or not in contact with the glass substrate 1402. In some implementations, the portion of the first electrode layer 1404 that is detached from the glass substrate 1402 is suspended over the glass substrate 1402 to allow the sense element 1400 to flex in a flex region 1412 in response to a sound wave while remaining attached to the glass substrate 1402 in an anchor region 1416. This flexure of the sense element 1400 generates a voltage in the piezoelectric layer 1406, as explained further below. The paddle region 1414 of the sense element 1400 is shown as being circular. In some implementations, the paddle region 1414 may be about 10 to 1000 micrometers in diameter. In some implementations, the paddle region 1414 can take on any number of different configurations, including being rectangular, square, or oval. In some implementations, the smallest and largest dimensions of the paddle region 1414 in different configurations may be about 10 to 1000 micrometers. Note that in other implementations, the dimensions of the paddle region 1414 can go beyond the aforementioned range. In some implementations, the paddle region 1414 is configured to produce appreciable bending in the flex region 1412 in response to a sound wave. In some implementations, the flex region 1412 may be about 2 to 10 micrometers long or about 10 to 1000 micrometers long. In some implementations, the flex region 1412 and the anchor regions 1416 may be about 2 to 1000 micrometers wide.

As shown in FIG. 14A, the sense element 1400 includes one anchor region 1416. One anchor point for a sense element may desensitize the sense element to film residual stresses and the effects of thermal and mounting stresses. In some implementations, the sense element 1400 may include multiple anchor points.

The first piezoelectric layer 1406 may include a number of different piezoelectric materials. For example, in various implementations, the first piezoelectric layer 1406 may include one or more of the following: polyvinylidene fluoride (PVDF), aluminum nitride (AlN), lead zirconate titanate (Pb[$Zr_xTi_{1-x}$]$O_3$, $0 \leq x \leq 1$), gallium arsenide (GaAs), and/or zinc oxide (ZnO). Single crystal materials, including quartz, lithium niobate ($LiNbO_3$), and/or lithium tantalite ($LiTaO_3$), may be used for the first piezoelectric layer 1406 in some implementations. The first piezoelectric layer 1406 generates a voltage in response to a sound wave that produces a strain in the piezoelectric layer 1406. In some implementations, the first piezoelectric layer 1406 may be about 0.25 to 5 micrometers thick or about 0.5 to 3 micrometers thick.

The second piezoelectric layer 1410, similar to the first piezoelectric layer 1406, may include a number of different piezoelectric materials. In some implementations, the first piezoelectric layer 1406 and the second piezoelectric layer 1410 may include the same piezoelectric material, and in some implementations, the first piezoelectric layer 1406 and the second piezoelectric layer 1410 may include different piezoelectric materials. Generally, however, the first piezoelectric layer 1406 and the second piezoelectric layer 1410 include the same piezoelectric material. The same piezoelectric material being used for both the first piezoelectric layer 1406 and the second piezoelectric layer 1410 may aid in the fabrication of the sense element 1400. For example, when using the same piezoelectric material, a partially fabricated sense element could be processed twice in the same tool for both piezoelectric layers, reducing tooling and materials needs. In some implementations, the second piezoelectric layer 1410 may be about 0.25 to 5 micrometers thick or about 0.5 to 3 micrometers thick. In other implementations, the second piezoelectric layer 1410 can have a different thickness.

The second piezoelectric layer 1410 can serve as an elastic layer to modify the neutral plane of the sense element 1400 and in this implementation, is not used to generate a voltage in response to a sound wave. The neutral plane is a plane in the cross-section of a beam or shaft along which there are no longitudinal stresses or strains. When the beam or shaft is bent, the material of the beam on one side of the neutral plane is in a state of tension, while the material of the beam on the opposite side of the neutral plane is in a state of compression.

If, for example, the neutral plane of the sense element 1400 runs through the center of the first piezoelectric layer 1406, this portion of the first piezoelectric layer 1406 may not generate an appreciable voltage in response to a sound wave due to the lack of strain in this area of the piezoelectric layer. Further, with the neutral plane of the sense element 1400 running through the first piezoelectric layer 1406, one portion of the first piezoelectric layer 1406 may be in tension and one portion of the first piezoelectric layer 1406 may be in compression. A voltage produced by the portion of the first piezoelectric layer 1406 in tension may have an opposite polarity to a voltage produced by the portion of the first piezoelectric layer 1406 in compression. These two voltages of opposite polarity may cancel each other, meaning that the first piezoelectric layer 1406 may not generate a voltage in response to a strain induced by a sound wave. Thus, the neutral plane may be modified such that it does not run though the first piezoelectric layer 1406 for the sense element 1400. The thickness and the elastic modulus of the second piezoelectric layer 1410 and of the first and second electrode layers 1404 and 1408 can be such that the neutral plane is modified in this manner in some implementations.

For example, assume that the first piezoelectric layer 1406 and the second piezoelectric layer 1410 are different piezoelectric materials—when the first piezoelectric layer has a high stiffness and the second piezoelectric layer has a low stiffness, the second piezoelectric layer 1410 will be thick in order to modify the neutral plane. Conversely, when the first piezoelectric layer 1406 has a low stiffness and the second piezoelectric layer 1410 has a high stiffness, the second piezoelectric layer will be thin in order to modify the neutral plane. Thus, there is a tradeoff between the thickness and the elastic modulus (which can determine stiffness) of the second piezoelectric layer 1410 needed to shift the neutral plane.

In some implementations, an electromechanical microphone device may include more than one sense element. The sense elements disclosed herein are generally low cost, in some implementations, allowing for multiple sense elements to be included in an electromechanical microphone device. For example, an electromechanical microphone device may include a plurality of sense elements, such as for example, 2, 4, or 8 sense elements. In some implementations, different sense elements are configured for sensitivity to different frequencies of sounds. For example, an electromechanical microphone device including two sense elements may include one sense element sensitive to frequencies from about 20 to 10,000 Hz, and one sense element sensitive to frequencies from about 10,000 to 20,000 Hz; this frequency response of the sense elements covers the hearing range for humans, which is normally limited to frequencies of about 20 Hz to 20,000 Hz. In some other implementations, multiple sense elements may be used to implement directional sensors and active noise cancellation schemes.

A sense element may be positioned in different orientations in a glass-encapsulated microphone. Referring to FIGS. 14A and 14B and the glass-encapsulated microphone 900 shown in FIG. 9B, the anchor region 1416 of the sense element 1400 may be facing towards the aperture 911, perpendicular to the aperture 911, or facing away from the aperture 911, for example. When multiple sense elements are included in an electromechanical microphone device, the positions of the anchor regions may be oriented in different manners and/or have a staggered orientation, for example. This may reduce cross-talk between the sense elements, for example.

Figure 15A:
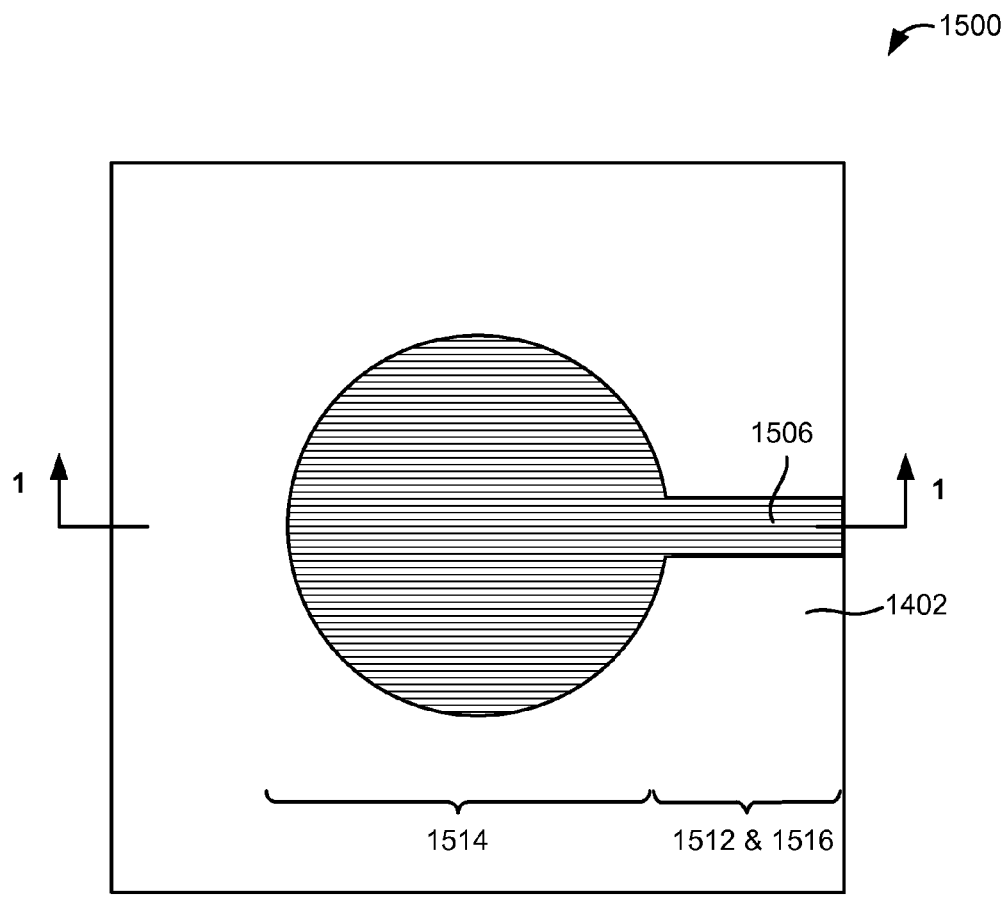
FIGS. 15A-17C show examples of a sense element of an electromechanical microphone device.

FIGS. 15A-17C show examples of a sense element of an electromechanical microphone device. FIG. 15A shows an example of a top-down view of the sense element 1500. FIG. 15B shows an example of a cross-sectional schematic view of the sense element 1500 through line 1-1 of FIG. 15A.

Figure 15B:
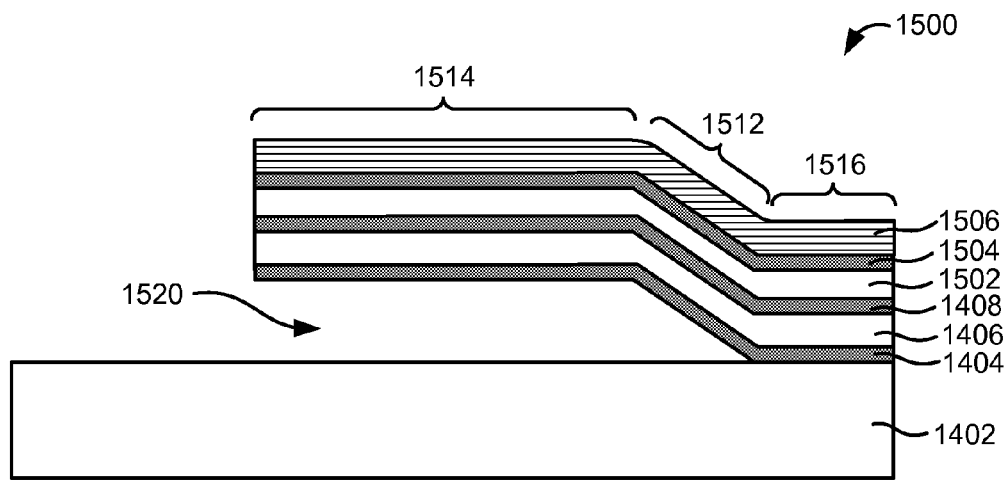

The sense element 1500 shown in FIGS. 15A and 15B includes a glass substrate 1402, a first electrode layer 1404, a first piezoelectric layer 1406, a second electrode layer 1408, a second piezoelectric layer 1502, a third electrode layer 1504, an elastic layer 1506, and an acoustic cavity 1520. Some elements of the sense element 1500 may be similar to the elements of the sense element 1400.

In some implementations, the sense element 1500 may be fabricated on the glass substrate that forms the glass-encapsulated microphone. In some other implementations, the sense element 1500 may be fabricated on a glass substrate and then that glass substrate may be incorporated into a glass-encapsulated microphone.

The first electrode layer 1404 and the second electrode layer 1408 serve to sense a voltage generated by the first piezoelectric layer 1406. As described above, the first electrode layer 1404 and the second electrode layer 1408 may include one or more of a number of different metals, and combinations thereof.

Similarly, the second electrode layer 1408 and the third electrode layer 1504 serve to sense a voltage generated by the second piezoelectric layer 1502. In some implementations, the third electrode 1504 may be the same metal as the first electrode layer 1404 and the second electrode layer 1408. In some implementations, the third electrode layer 1504 may be about 100 to 300 nanometers thick.

As shown in FIG. 15B, at least a portion of a first electrode layer 1404 is disposed on, or attached to, the glass substrate 1402, and at least a portion of the first electrode layer 1404 is suspended over, detached from, or not in contact with the glass substrate 1402. In some implementations, the portion of the first electrode layer 1404 that is detached from the glass substrate 1402 is suspended over the glass substrate 1402 to allow the sense element 1500 to flex in a flex region 1512 in response to a sound wave while remaining attached to the glass substrate 1402 in an anchor region 1516. This flexure of the sense element 1500 generates a voltage in the piezoelectric layer 1406 and a voltage in the piezoelectric layer 1502. The flex region 1512 and the anchor region 1516 of the sense element 1500 may be similar to the flex region 1412 and the anchor region 1416 of the sense element 1400, as described above. The paddle region 1514 of the sense element 1500 also may be similar to the paddle region 1414 of the sense element 1400, as described above. Also similar to the sense element 1400, the sense element 1500 may include multiple anchor points.

As described above, the first piezoelectric layer 1406 may include a number of different piezoelectric materials, including one or more of the following: polyvinylidene fluoride (PVDF), aluminum nitride (AlN), lead zirconate titanate (Pb[$Zr_xTi_{1-x}$]$O_3$, $0 \leq x \leq 1$), gallium arsenide (GaAs), and/or zinc oxide (ZnO). The second piezoelectric layer 1502, similar to the first piezoelectric layer 1406, also may include a number of different piezoelectric materials. Generally, the same piezoelectric material is used for both the first piezoelectric layer 1406 and the second piezoelectric layer 1502 to aid in the fabrication process, as explained above. The first piezoelectric layer 1406 and the second piezoelectric layer 1502 both generate a voltage in response to a sound wave that produces a strain in the piezoelectric layers 1406 and 1502. In some implementations, the first piezoelectric layer 1406 and the second piezoelectric layer 1502 can be each about 0.25 to 5 micrometers thick or about 0.5 to 5 micrometers thick. In other implementations, the second piezoelectric layer 1502 can have a different thickness.

The elastic layer 1506 may include a number of different materials, including silicon nitride (SiN), silicon oxynitride (SiON), silicon oxide (SiO$_2$), silicon (Si), aluminum nitride (AlN), a metal, or a polymer, for example. In some implementations, the elastic layer 1506 may be about 0.25 to 5 micrometers thick. The elastic layer 1506 modifies the neutral plane of the sense element 1500, as described above. In some implementations, the thickness and modulus of the electrode layers 1404, 1408, and 1504, the piezoelectric layers 1406 and 1502, and the elastic layer 1506 are specified such that the neutral plane runs through the second electrode layer 1408. With the neutral plane running through the second electrode layer 1408, when the first piezoelectric layer 1406 is in compression, the second piezoelectric layer 1502 is in tension, and vice versa. In this configuration, voltages would be generated in the first piezoelectric layer 1406 and the second piezoelectric layer 1502 in response to a sound wave. In some implementations, the elastic layer 1506 also may protect the third electrode layer 1504 from oxidation or from the ambient environment.

In some implementations, the sense element 1500 includes a second elastic layer (not shown). In these implementations, the second elastic layer may be underneath the first electrode layer 1404. The second elastic layer may be similar to the first elastic layer and may include a number of different materials, including SiN, SiON, SiO$_2$, Si, AlN, a metal, or a polymer. Similar to the elastic layer 1506, the second elastic layer may modify the neutral plane of the sense element 1500 and also may protect the first electrode layer 1404 from oxidation or from the ambient environment.

Figure 16A:
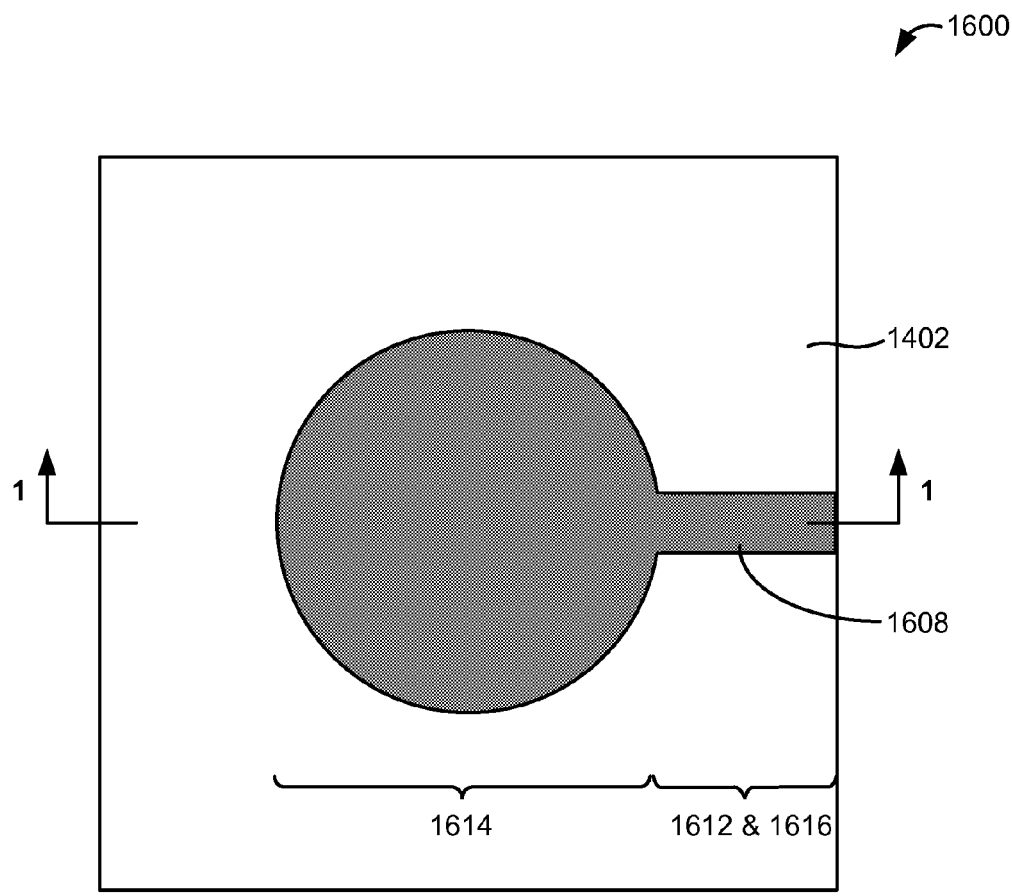
Figure 16B:
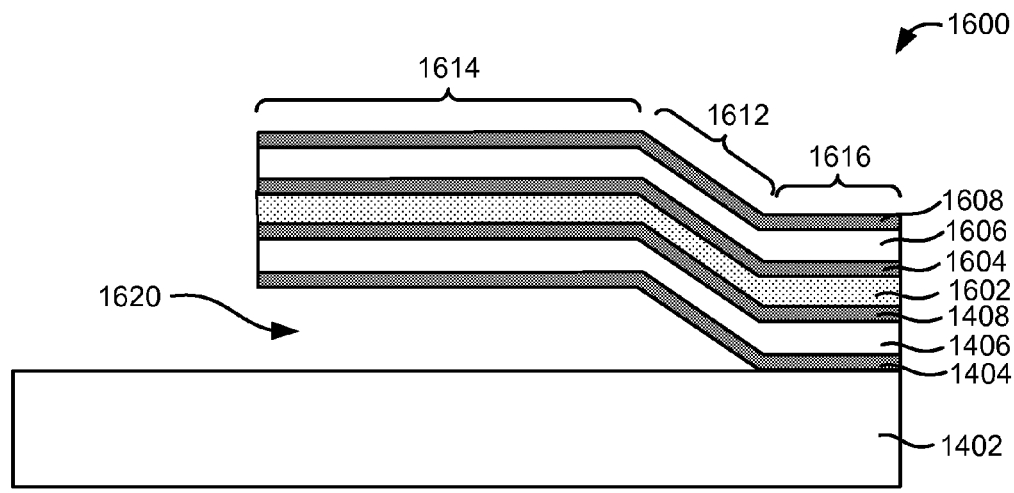

FIGS. 16A and 16B show examples of a sense element of an electromechanical microphone device. FIG. 16A shows an example of a top-down view of the sense element 1600. FIG. 16B shows an example of a cross-sectional schematic view of the sense element 1600 through line 1-1 of FIG. 16A.

The sense element 1600 shown in FIGS. 16A and 16B includes a glass substrate 1402, a first electrode layer 1404, a first piezoelectric layer 1406, a second electrode layer 1408, an elastic layer 1602, a third electrode layer 1604, a second piezoelectric layer 1606, a fourth electrode layer 1608, and an acoustic cavity 1620. Some elements of the sense element 1600 may be similar to the elements of the sense elements 1400 and 1500 illustrated in FIGS. 14A, 14B and 15A, 15B, respectively.

In some implementations, the sense element 1600 may be fabricated on the glass substrate that forms the glass-encapsulated microphone. In some other implementations, the sense element 1600 may be fabricated on a glass substrate and then that glass substrate may be incorporated into a glass-encapsulated microphone.

The first electrode layer 1404 and the second electrode layer 1408 serve to sense a voltage generated by the first piezoelectric layer 1406. As described above, the first electrode layer 1404 and the second electrode layer 1408 may include one or more of a number of different metals, and combinations thereof.

Similarly, the third electrode layer 1604 and the fourth electrode layer 1608 serve to sense a voltage generated by the second piezoelectric layer 1606. The third electrode layer 1604 and the fourth electrode layer 1608 may be similar to the first electrode layer 1404 and the second electrode layer 1408, and may include one or more of a number of different metals, and combinations thereof. The third electrode layer 1604 and the fourth electrode layer 1608 may include copper (Cu), nickel (Ni), ruthenium (Ru), tungsten (W), platinum (Pt), molybdenum (Mo), aluminum (Al), titanium (Ti), and/or gold (Au), for example. In some implementations, third electrode layer 1604 and the fourth electrode layer 1608 may be each about 100 to 300 nanometers thick.

As shown in FIG. 16B, at least a portion of a first electrode layer 1404 is disposed on, or attached to, the glass substrate 1402, and at least a portion of the first electrode layer 1404 is suspended over, detached from, or not in contact with the glass substrate 1402. In some implementations, the portion of the first electrode layer 1404 that is detached from the glass substrate 1402 is suspended over the glass substrate 1402 to allow the sense element 1600 to flex in a flex region 1612 in response to a sound wave while remaining attached to the glass substrate 1602 in an anchor region 1616. This flexure of the sense element 1600 generates a voltage in the first piezoelectric layer 1406 and a voltage in the second piezoelectric layer 1606. The flex region 1612 and the anchor region 1616 of the sense element 1600 may be similar to the flex region 1412 and the anchor region 1416 of the sense element 1400, as described above. The paddle region 1614 of the sense element 1600 also may be similar to the paddle region 1414 of the sense element 1400, as described above. Also similar to the sense element 1400, the sense element 1600 may include multiple anchor points.

As described above, the first piezoelectric layer 1406 may include a number of different piezoelectric materials. The second piezoelectric layer 1606, similar to the first piezoelectric layer 1406, also may include a number of different piezoelectric materials. In some implementations, the same piezoelectric material is used for both the first piezoelectric layer and the second piezoelectric layer to simplify fabrication of the sense element 1600, as explained above. The first piezoelectric layer 1406 and the second piezoelectric layer 1606 both generate a voltage in response to a sound wave that produces a strain in the piezoelectric layers. In some implementations, the first piezoelectric layer and the second piezoelectric layer can be each about 0.25 to 5 micrometers thick, or more specifically, about 0.5 to 3 micrometers thick.

The elastic layer 1602 may include a number of different materials, including silicon nitride (SiN), silicon oxynitride (SiON), silicon oxide (SiO$_2$), silicon (Si), aluminum nitride (AlN), a metal, or a polymer, for example. In some implementations, the elastic layer 1602 may be about 0.25 to 5 micrometers thick. The elastic layer 1602 serves to displace the first piezoelectric layer 1406 and the second piezoelectric layer 1606 away from the neutral plane, which runs through the elastic layer 1602, in some implementations. By displacing the first piezoelectric layer 1406 and the second piezoelectric layer 1606 away from the neutral plane, these piezoelectric layers may experience a larger strain in response to a sound wave and generate a larger voltage. In some implementations, this may improve the signal to noise ratio of the sense element 1600. In some implementations, the elastic layer 1602 includes a material having a low elastic modulus and is thick, which would induce large strains in the piezoelectric layers.

Figure 17A:
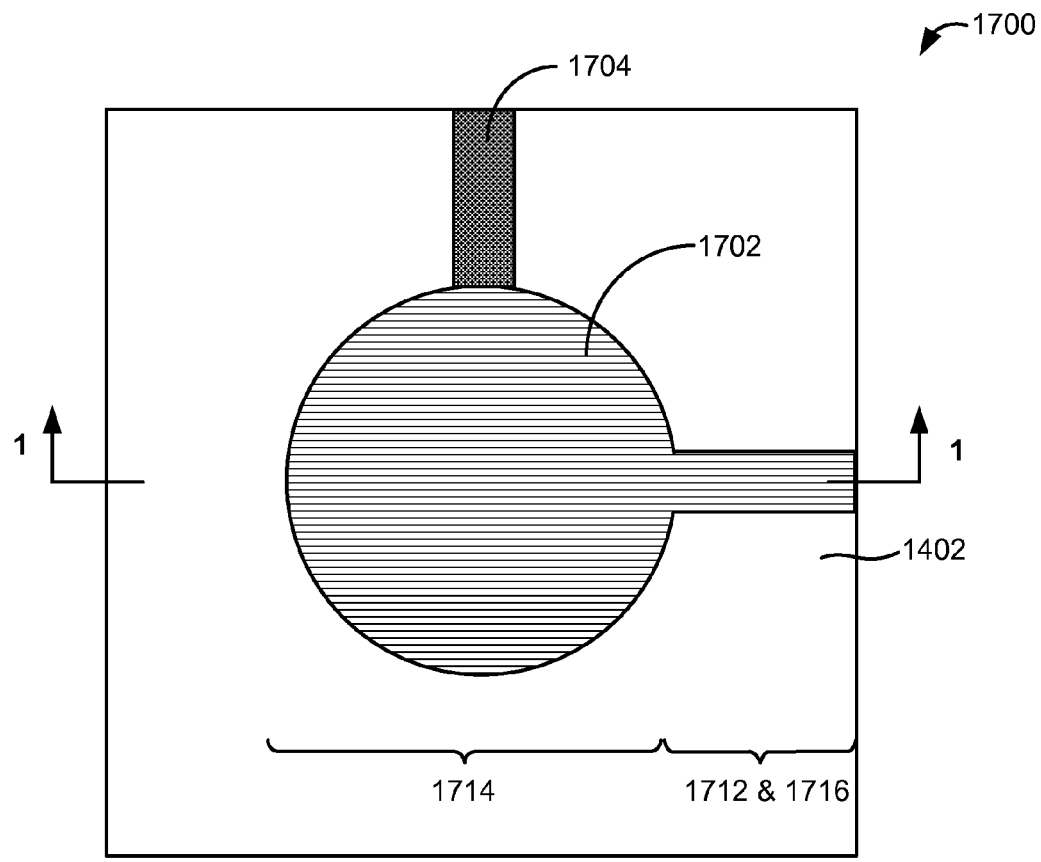
Figure 17B:
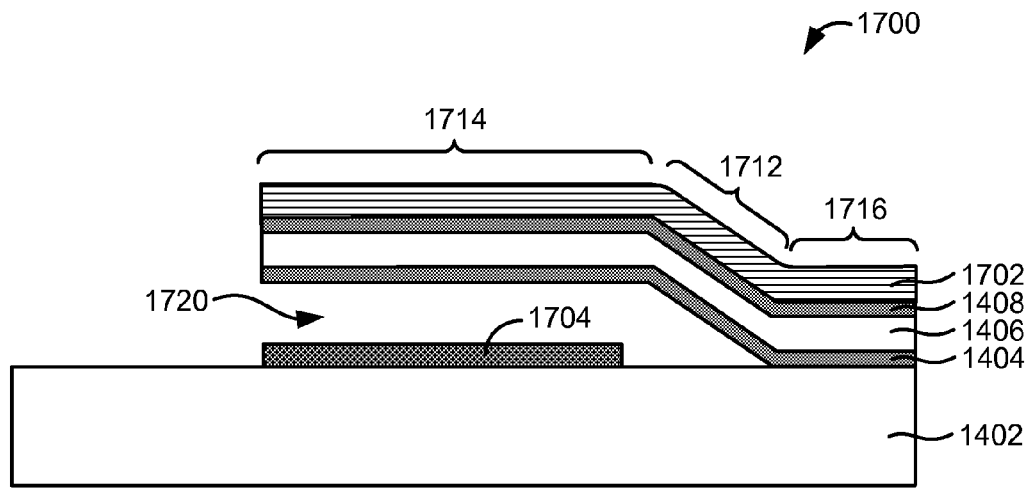
Figure 17C:
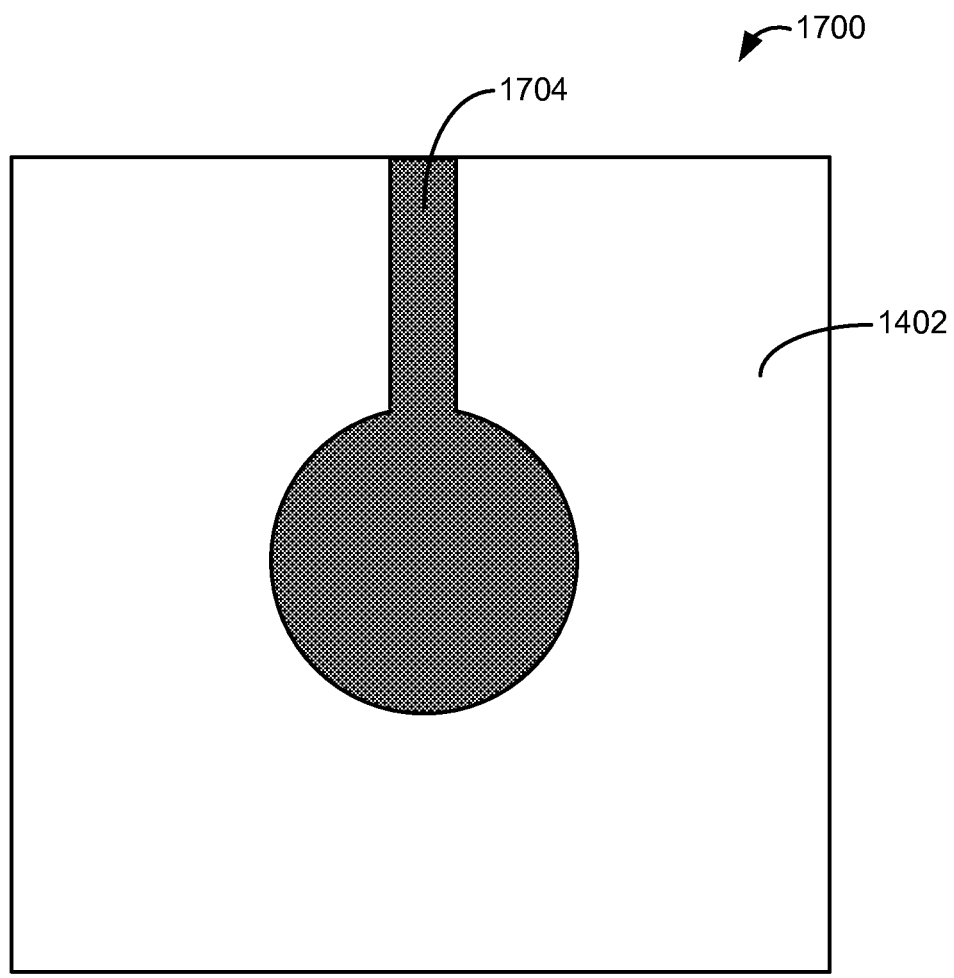

FIGS. 17A-17C show examples of a sense element of an electromechanical microphone device. FIG. 17A shows an example of a top-down view of the sense element 1700. FIG. 17B shows an example of a cross-sectional schematic view of the sense element 1700 through line 1-1 of FIG. 17A. FIG. 17C shows an example of a top-down view of the substrate of the sense element 1700.

The sense element 1700 shown in FIGS. 17A-17C includes a glass substrate 1402, a substrate electrode layer 1704, a first electrode layer 1404, a first piezoelectric layer 1406, a second electrode layer 1408, an elastic layer 1702, and an acoustic cavity 1720. Some elements of the sense element 1700 may be similar to the elements of the sense elements 1400, 1500, and 1600, as depicted in FIGS. 14A, 14B, 15A, 15B and 16A, 16B, respectively.

In some implementations, the sense element 1700 may be fabricated on the glass substrate that forms the glass-encapsulated microphone. In some other implementations, the sense element 1700 may be fabricated on a glass substrate and then that glass substrate may be incorporated into a glass-encapsulated microphone.

In some implementations, the first electrode layer 1404 and the second electrode layer 1408 serve to sense a voltage generated by the first piezoelectric layer 1406. As described above, the first electrode layer 1404 and the second electrode layer 1408 may include one or more of a number of different metals, and combinations thereof.

As shown in FIG. 17B, at least a portion of a first electrode layer 1404 is disposed on, or attached to, the glass substrate 1402, and at least a portion of the first electrode layer 1404 is suspended over, detached from, or not in contact with the glass substrate 1402. In some implementations, the portion of the first electrode layer 1404 that is detached from the glass substrate 1402 is suspended over the glass substrate 1402 to allow the sense element 1700 to flex in a flex region 1712 in response to a sound wave while remaining attached to the glass substrate 1402 in an anchor region 1716. This flexure of the sense element 1700 generates a voltage in the piezoelectric layer 1406. The flex region 1712 and the anchor region 1716 of the sense element 1700 may be similar to the flex region 1412 and the anchor region 1416 of the sense element 1400, as described above. The paddle region 1714 of the sense element 1700 also may be similar to the paddle region 1414 of the sense element 1400, as described above. Also similar to the sense element 1400, the sense element 1700 may include multiple anchor points.

As described above, the first piezoelectric layer 1406 may include a number of different piezoelectric materials. The first piezoelectric layer 1406 generates a voltage in response to a sound wave that produces a strain in the piezoelectric layer.

The elastic layer 1702 may include a number of different materials, including silicon nitride (SiN), silicon oxynitride (SiON), silicon oxide ($SiO_2$), silicon (Si), aluminum nitride (AlN), a metal, or a polymer, for example. In some implementations, the elastic layer 1702 may be about 0.25 to 5 micrometers thick. The elastic layer 1702 serves to modify the neutral plane of the sense element 1700, similar to the second piezoelectric layer 1410, described above.

As shown in FIG. 17C, the glass substrate 1402 includes the substrate electrode layer 1704. In some implementations, the substrate electrode layer 1704 may have approximately the same surface area as the paddle region 1714. In some other implementations, the substrate electrode layer 1704 may have a larger surface area or a smaller surface area than the paddle region 1714.

In some implementations, the substrate electrode layer 1704 may include one or more of a number of different metals, and combinations thereof. For example, the substrate electrode layer 1704 may include copper (Cu), nickel (Ni), ruthenium (Ru), tungsten (W), platinum (Pt), molybdenum (Mo), aluminum (Al), titanium (Ti), and/or gold (Au), for example. In some implementations, the substrate electrode layer 1704 may be about 50 to 300 nanometers thick.

In some implementations with the substrate electrode layer 1704, the sense element 1700 also may generate a capacitive signal in response to a sound wave that changes the distance between the substrate electrode layer 1704 and the first electrode layer 1404. In some other implementations, a bias may be applied between the substrate electrode layer 1704 and the first electrode layer 1404 that changes the distance between these two electrode layers. This bias may change the dimensions of the acoustic cavity 1720, and may make the sense element 1700 more or less sensitive to certain frequency sound waves. For example, when a bias decreases the distance between the substrate electrode layer 1704 and the first electrode layer 1404, the sense element 1700 may be less sensitive to lower frequency sound waves.

Elements of the sense elements 1400, 1500, 1600 and 1700 may be combined and or substituted within the sense elements as shown or to generate sense elements having different configurations. For example, the elastic layer or layers in any of the sense elements 1500, 1600 and 1700 may be a piezoelectric layer. As another example, an elastic layer 1506 may be included in any of the sense elements 1400, 1600, or 1700 to protect electrode layers from oxidation or from the ambient environment.

Further, the material layers in the sense elements described herein are shown as being coextensive. Other configurations of the material layers are possible, however. For example, in some implementations of the sense element 1400, the second piezoelectric layer 1410 may be formed on the paddle region 1414 of the sense element 1400 and not on the flex region 1412 or the anchor region 1416. As another example, in some implementations of the sense element 1700, the first electrode layer 1404 and the second electrode layer 1408 may be formed on the flex region 1712 and the anchor region 1716 of the sense element 1700 and not on the paddle region 1714. The regions (i.e., the anchor region, the flex region, or the paddle region) of a sense element in which different material layers are formed depends on the desired placement of the neutral plane. The regions of a sense element in which different material layers are formed also depends on the function of the material layer (e.g., a piezoelectric material, a conducting material, an insulating material), as known by a person having ordinary skill in the art.

In some implementations, a sense element may be optimized for sensitivity, frequency response, linearity, and to reduce parasitic capacitance. To increase the sensitivity of a sense element, the relative amount of signal generated by the piezoelectric layer or layers in the sense element can be increased compared to other sources of noise around the sense element. This may be done by increasing the amount of flexure in the flex region in response to a sound wave. Too much deformation in the flex region, however, may generate non-linearities in the signal from a piezoelectric layer. Thus, the acoustic cavity of the sense element and the sense element itself may be designed such that the flex region does not flex too much. To reduce parasitic capacitance, the areas of the electrode layers may be reduced to portions of the sense element that flex in response to a sound wave. The overall dimensions of a sense element and the size of the acoustic cavity may be modified to change the frequency response of the sense element.

Figure 18:
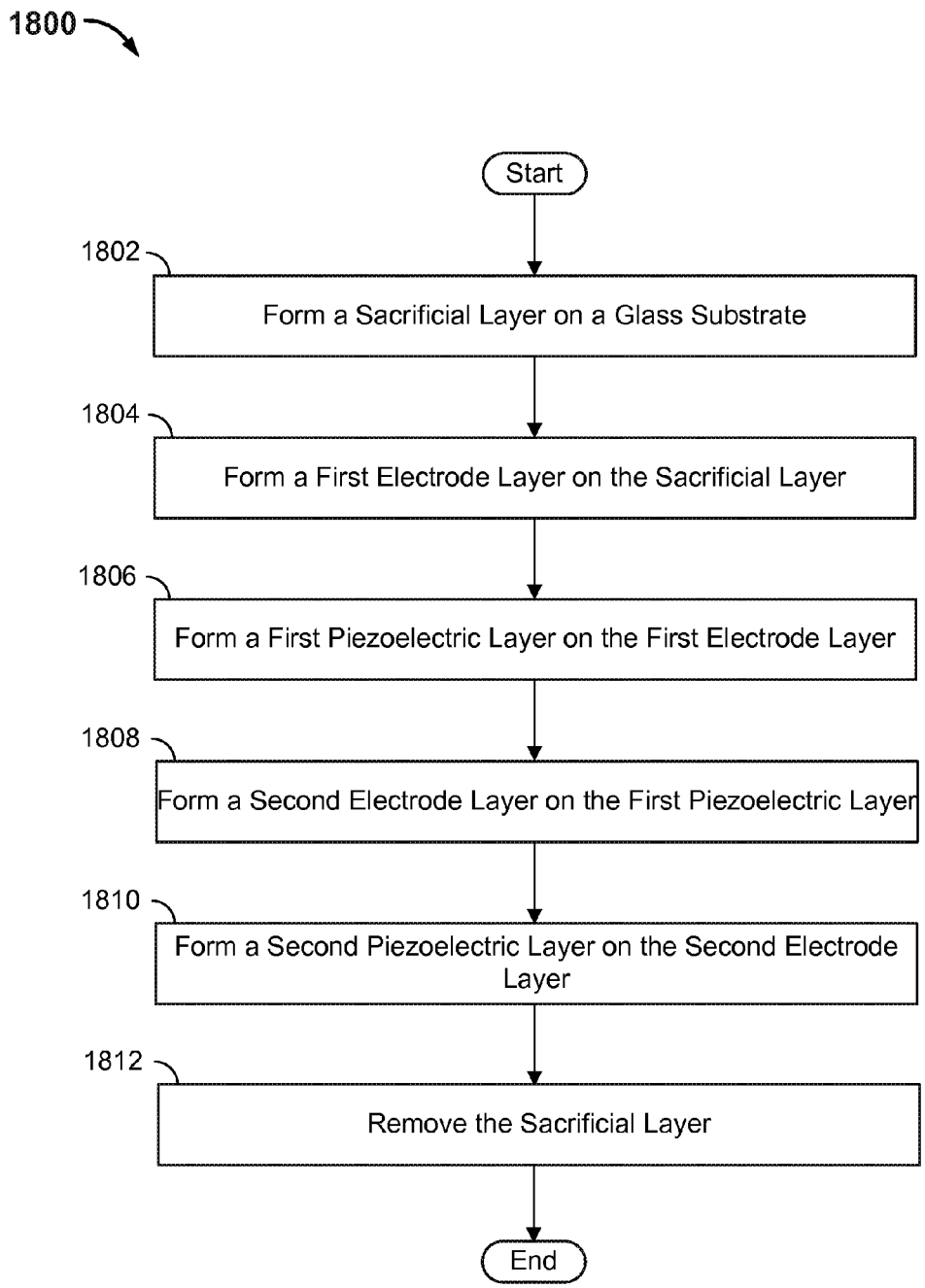
FIG. 18 shows an example of a flow diagram depicting a method of forming a sense element.

FIG. 18 shows an example of a flow diagram depicting a method of forming a sense element. More specifically, FIG. 18 shows an example of a flow diagram depicting a method of forming the sense element 1400 shown in FIGS. 14A and 14B. Note that the operations of the method 1800 may be combined and/or rearranged to form any of the sense elements disclosed herein. Note also that the patterning and etching of the different layers, as described below, may be performed to achieve different patterns of the layers in different regions of a sense element. Because the operations of the method 1800 may be performed at about room temperature to 400° C. (i.e., the processes of the method may be performed at about 400° C. or lower), the method 1800 is compatible with glass and flat-panel display glass technologies.

At block 1802, a sacrificial layer is formed on a glass substrate. As described above, the glass substrate may be the glass substrate that forms the glass-encapsulated microphone or a glass substrate that may be bonded to the glass substrate that forms the glass-encapsulated microphone. Prior to forming the sacrificial layer on the glass substrate, chromium (Cr) or gold (Au) metallization can be deposited onto the glass substrate to form conductive traces, bond pads, and/or ledge pads. In some implementations, when Cr or Au metallization is deposited onto the glass substrate, an oxide or a nitride may be deposited onto the Cr or Au metallization to passivate the metal.

In some implementations, a copper (Cu) layer is used as the sacrificial layer. The Cu layer may be sputtered, evaporated, or electroplated onto the glass substrate. The Cu layer may be about 0.1 to 20 micrometers thick in various implementations. In some implementations, an aluminum (Al) layer is used as the sacrificial layer. The Al layer may be sputtered or evaporated onto the glass substrate. The Al layer may be about 0.1 to 10 micrometers thick in various implementations. In further implementations, a molybdenum (Mo) layer or an amorphous silicon (Si) layer is used as the sacrificial layer. The Mo layer or amorphous Si layer may be sputtered or evaporated onto the glass substrate. The molybdenum layer or amorphous silicon layer may be about 0.1 to 10 micrometers thick in various implementations.

In some implementations, the sacrificial layer is then patterned and etched. The sacrificial layer may be patterned with photoresist used in integrated circuit manufacturing as known by a person having ordinary skill in the art and then etched. Cu may be etched with a wet etching process using a hydrogen peroxide ($H_2O_2$) and acetic acid ($CH_3COOH$) based etchant or using an ammonical sodium persulfate solution. Al may be etched with a wet etching process using an alkaline based etchant. Alkaline based etchants include potassium hydroxide (KOH) or sodium hydroxide (NaOH), for example. Mo or amorphous Si may be etched with a dry reactive etching process using a fluorine-based plasma.

At block 1804, the first electrode layer is formed on glass substrate and the sacrificial layer. In some implementations, the first electrode layer of copper (Cu), nickel (Ni), ruthenium (Ru), tungsten (W), platinum (Pt), molybdenum (Mo), aluminum (Al), titanium (Ti), and/or gold (Au) may be formed with a sputtering process or an evaporation process. In some implementations, the first electrode layer is then patterned and etched. The first electrode layer may be patterned and etched using processes used in integrated circuit manufacturing as known by a person having ordinary skill in the art.

At block 1806, the first piezoelectric layer is formed on the first electrode layer. In some implementations, the first piezoelectric layer can include polyvinylidene fluoride (PVDF), aluminum nitride (AlN), lead zirconate titanate ($Pb[Zr_xTi_{1-x}]O_3$, $0 \leq x \leq 1$), gallium arsenide (GaAs), zinc oxide (ZnO), or other appropriate material and may be formed with a reactive ion sputtering process, a direct current (DC) sputtering process, or other appropriate process. In some implementations, the piezoelectric layer is then patterned and etched. The piezoelectric layer may be patterned and etched using processes used in integrated circuit manufacturing as known by a person having ordinary skill in the art.

At block 1808, the second electrode layer is formed on the piezoelectric layer. The second electrode layer may be formed with a process similar to the process used to form the first electrode layer. The second electrode layer may be patterned and etched using processes used in integrated circuit manufacturing as known by a person having ordinary skill in the art.

At block 1810, the second piezoelectric layer is formed on the second electrode layer. The second piezoelectric layer may be formed with a process similar to the process used to form the first piezoelectric layer. The second piezoelectric layer may be patterned and etched using processes used in integrated circuit manufacturing as known by a person having ordinary skill in the art.

At block 1812, the sacrificial layer is removed. If the sacrificial layer is a Cu layer, the Cu layer may be removed with a wet etching process using an etchant as described above. If the sacrificial layer is an Al layer, the Al layer may be removed with a wet etching process using an alkaline based etchant. If the sacrificial layer is a Mo layer or an amorphous Si layer, these layers may be removed with a dry reactive etching process using a fluorine-based plasma.

In implementations of sense elements including non-piezoelectric elastic layers, an elastic layer including silicon nitride (SiN), silicon oxynitride (SiON), silicon oxide ($SiO_2$), silicon (Si), aluminum nitride (AlN), a metal, or a polymer, for example, may be formed using an appropriate processing technique, as know by a person having ordinary skill in the art. For example, an elastic layer may be formed with a sputtering process, a chemical vapor deposition (CVD) process, a physical vapor deposition (PVD) process, or an electroplating process.

Further details related to the formation of different layers of material in electromechanical devices are given in U.S. patent application Ser. No. 13/048,798, entitled "MICROELECTROMECHANICAL SYSTEM DEVICE INCLUDING A METAL PROOF MASS AND A PIEZOELECTRIC COMPONENT" and filed Mar. 15, 2011, which is hereby incorporated by reference.

Figure 19A:
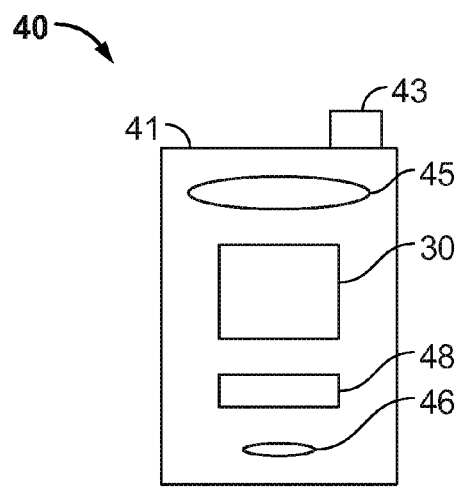
FIGS. 19A and 19B show examples of system block diagrams illustrating a display device that includes a plurality of interferometric modulators.
Figure 19B:
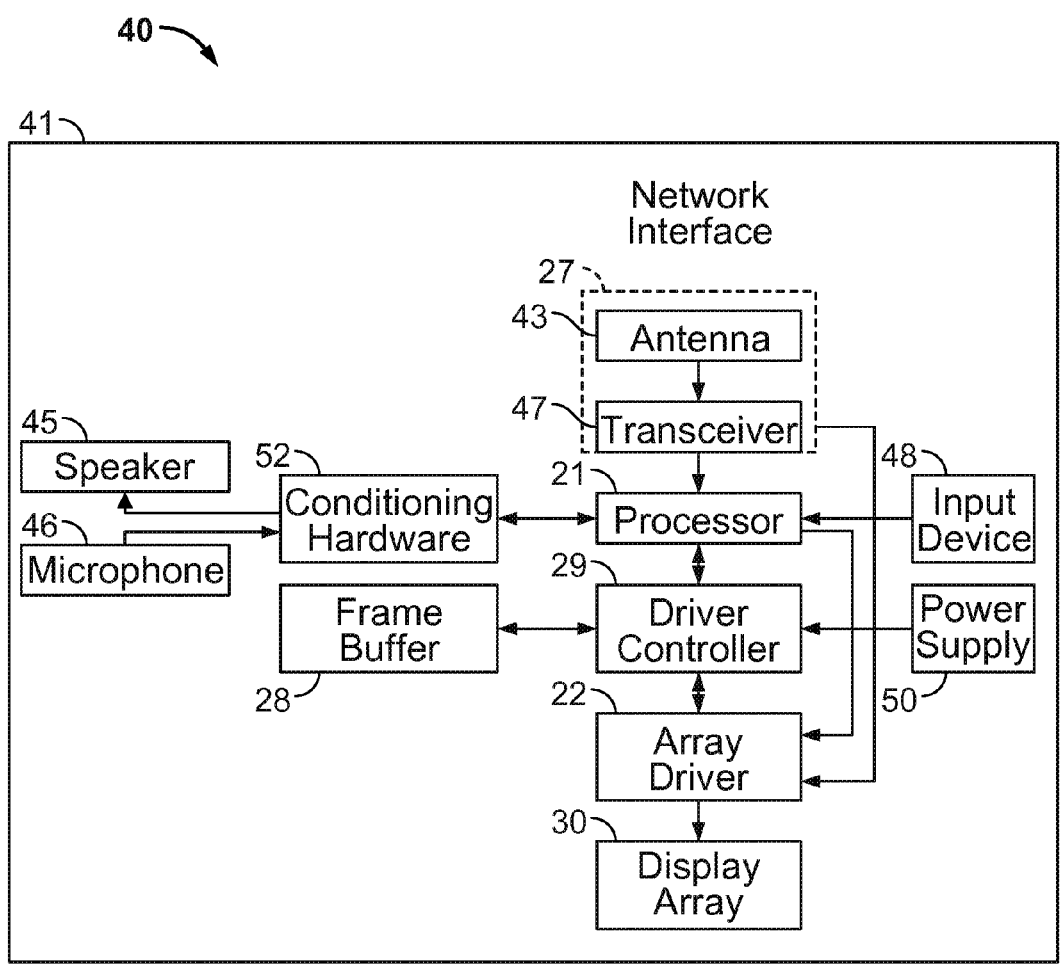

FIGS. 19A and 19B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 19B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for detecting sound comprising:
a glass substrate;
an electromechanical microphone device disposed on a surface of the glass substrate;
an integrated circuit device disposed on the surface of the glass substrate, the integrated circuit device configured to sense output from the electromechanical microphone device;
a cover glass bonded to the surface of the glass substrate, wherein the cover glass includes a first recess that defines a first cavity when the cover glass is bonded to the surface of the glass substrate, the first cavity being configured to accommodate the electromechanical microphone device, a portion of the first recess being at an edge of the cover glass such that the cover glass and the glass substrate, when bonded together, define an aperture at the edge of the cover glass, the aperture configured to allow a sound wave to interact with the electromechanical microphone device;
a layer of metal between the glass substrate and the electromechanical microphone device; and
a layer of metal on portions of the first cavity proximate the electromechanical microphone device.

2. The apparatus of claim 1, wherein the cover glass is bonded to the surface of the glass substrate with a joining ring, wherein the joining ring includes a metal bond ring.

3. The apparatus of claim 1, wherein the cover glass is bonded to the surface of the glass substrate with a joining ring, wherein the joining ring includes an epoxy.

4. The apparatus of claim 1, wherein the first cavity is further configured to accommodate the integrated circuit device.

5. The apparatus of claim 1, wherein the cover glass further includes a second recess that defines a second cavity when the cover glass is bonded to the surface of the glass substrate, the second cavity being configured to accommodate the integrated circuit device.

6. The apparatus of claim 5, wherein the second cavity is physically isolated from the first cavity.

7. The apparatus of claim 5, wherein when the cover glass is bonded to the surface of the glass substrate, the second cavity is hermetically sealed.

8. The apparatus of claim 1, wherein the cover glass includes a cutout, the cutout configured to allow the sound wave to interact with the electromechanical microphone device, wherein the cutout exposes a portion of the electromechanical microphone device approximately perpendicular to a portion of the electromechanical microphone device exposed by the aperture.

9. The apparatus of claim 1, wherein the electromechanical microphone device includes at least one of a piezoelectric sense element, a capacitive sense element, and a hybrid piezoelectric and capacitive sense element.

10. The apparatus of claim 1, wherein the electromechanical microphone device includes a plurality of sense elements.

11. The apparatus of claim 1, wherein the layers of metal are configured as an electrostatic shield.

12. The apparatus of claim 1, wherein a thickness of the glass substrate is about 100 to 700 micrometers, and wherein a thickness of the cover glass is about 100 to 700 micrometers.

13. The apparatus of claim 1, wherein the aperture has a height of about 100 to 300 micrometers.

14. The apparatus of claim 1, wherein the aperture has a width of about 20 to 1000 micrometers.

15. The apparatus of claim 1, wherein a length of the glass substrate is about 1 to 5 millimeters, wherein a width of the glass substrate is about 1 to 5 millimeters, wherein a length of the cover glass is about 1 to 5 millimeters, and wherein a width of the cover glass is about 1 to 5 millimeters.

16. The apparatus of claim 1, wherein a plurality of portions of the first recess are at an edge of the cover glass such that the cover glass and the glass substrate define multiple apertures when the cover glass is bonded to the surface of the glass substrate, the apertures configured to allow the sound wave to interact with the electromechanical microphone device.

17. The apparatus of claim 1, wherein the surface of the glass substrate further includes a plurality of conductive traces and a plurality of ledge pads, wherein the plurality of conductive traces are in electrical contact with the integrated circuit device, wherein each of the plurality of ledge pads is in electrical contact with a conductive trace of the plurality of conductive traces, and wherein the plurality of ledge pads are on an outside surface of the apparatus when the cover glass is bonded to the surface of the glass substrate.

18. The apparatus of claim 17, further comprising:
a flex tape, the flex tape including:
a plurality of flex pads at a first end of the flex tape,
a plurality of contacts at a second end of the flex tape, and
a plurality of electrical connections connecting each of the plurality of flex pads with a contact of the plurality of contacts,
wherein each of the plurality of flex pads is in electrical contact with a ledge pad of the plurality of ledge pads.

19. The apparatus of claim 1, further comprising:
a display;
a processor that is configured to communicate with the display, the processor being configured to process image data; and
a memory device that is configured to communicate with the processor.

20. The apparatus of claim 19, further comprising:
a driver circuit configured to send at least one signal to the display; and
a controller configured to send at least a portion of the image data to the driver circuit.

21. The apparatus of claim 19, further comprising:
an image source module configured to send the image data to the processor.

22. The apparatus of claim 21, wherein the image source module includes at least one of a receiver, transceiver, and transmitter.

23. The apparatus of claim 19, further comprising:
an input device configured to receive input data and to communicate the input data to the processor.

24. An apparatus comprising:
a glass substrate;
an electromechanical microphone device disposed on a surface of the glass substrate;
an integrated circuit device disposed on the surface of the glass substrate, the integrated circuit device configured to sense output from the electromechanical microphone device; and
a cover glass bonded to the surface of the glass substrate with a joining ring, wherein the cover glass includes a first recess that defines a first cavity when the cover glass is bonded to the surface of the glass substrate and a second recess that defines a second cavity when the cover glass is bonded to the surface of the glass substrate, the first cavity being configured to accommodate the electromechanical microphone device, the second cavity being configured to accommodate the integrated circuit device, a portion of the first recess being at an edge of the cover glass such that when the cover glass is bonded to the surface of the glass substrate, the cover glass and the glass substrate define an aperture at the edge of the cover glass, the aperture configured to allow a sound wave to interact with the electromechanical microphone device.

25. The apparatus of claim 24, wherein the second cavity is physically isolated from the first cavity.

26. The apparatus of claim 25, wherein when the cover glass is bonded to the surface of the glass substrate, the second cavity is hermetically sealed.

27. The apparatus of claim 24, wherein the electromechanical microphone device includes at least one of a piezoelectric sense element, a capacitive sense element, and a hybrid piezoelectric and capacitive sense element.

28. A method of forming an acoustic microphone comprising:
providing a glass substrate, the glass substrate having an electromechanical microphone device disposed on a surface of the glass substrate;
bonding a cover glass to the surface of the glass substrate, wherein the cover glass includes a first recess that defines a first cavity when the cover glass is bonded to the surface of the glass substrate, the first cavity being configured to accommodate the electromechanical microphone device, a portion of the first recess being at an edge of the cover glass such that when the cover glass is bonded to the surface of the glass substrate, an aperture is defined, the aperture configured to allow a sound wave to interact with the electromechanical microphone device;
forming a layer of metal between the glass substrate and the electromechanical microphone device; and
forming a layer of metal on portions of the first cavity proximate the electromechanical microphone device.

29. The method of claim 28, the glass substrate further having an integrated circuit device disposed on the surface of the glass substrate, the integrated circuit device configured to sense output from the electromechanical microphone device.

30. The method of claim 28, wherein the bonding is performed with a metal bond ring.

31. The method of claim 28, wherein the bonding is performed with an epoxy.

32. An apparatus for detecting sound comprising:

a glass substrate;

an electromechanical microphone device disposed on a surface of the glass substrate;

an integrated circuit device disposed on the surface of the glass substrate, the integrated circuit device configured to sense output from the electromechanical microphone device; and a cover glass bonded to the surface of the glass substrate, wherein the cover glass includes a first recess that defines a first cavity when the cover glass is bonded to the surface of the glass substrate, the first cavity being configured to accommodate the electromechanical microphone device, a portion of the first recess being at an edge of the cover glass such that the cover glass and the glass substrate, when bonded together, define an aperture at the edge of the cover glass, the aperture configured to allow a sound wave to interact with the electromechanical microphone device, wherein:

the surface of the glass substrate further includes a plurality of conductive traces and a plurality of ledge pads;

the plurality of conductive traces are in electrical contact with the integrated circuit device;

each of the plurality of ledge pads is in electrical contact with a conductive trace of the plurality of conductive traces; and the plurality of ledge pads are on an outside surface of the apparatus when the cover glass is bonded to the surface of the glass substrate.

33. The apparatus of claim 32, further comprising:

a flex tape, the flex tape including:

a plurality of flex pads at a first end of the flex tape, a plurality of contacts at a second end of the flex tape, and a plurality of electrical connections connecting each of the plurality of flex pads with a contact of the plurality of contacts, wherein each of the plurality of flex pads is in electrical contact with a ledge pad of the plurality of ledge pads.

* * * * *